(12) United States Patent
Shinoda et al.

(10) Patent No.: US 11,496,074 B2
(45) Date of Patent: Nov. 8, 2022

(54) MOTOR DRIVE APPARATUS INCLUDING POWER STORAGE DEVICE

(71) Applicant: FANUC CORPORATION, Yamanashi (JP)

(72) Inventors: Shougo Shinoda, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 310 days.

(21) Appl. No.: 16/856,035

(22) Filed: Apr. 23, 2020

(65) Prior Publication Data

US 2020/0343836 A1    Oct. 29, 2020

(30) Foreign Application Priority Data

Apr. 25, 2019  (JP) .............................. JP2019-084324
Apr. 7, 2020   (JP) .............................. JP2020-069213

(51) Int. Cl.
*H02P 3/14*     (2006.01)
*H02P 5/74*     (2006.01)
(Continued)

(52) U.S. Cl.
CPC .................. *H02P 3/14* (2013.01); *H02J 7/34* (2013.01); *H02P 5/74* (2013.01); *H02J 3/30* (2013.01); *H02J 3/32* (2013.01)

(58) Field of Classification Search
CPC ...... H02J 7/34–35; H02J 7/14–30; H02J 3/30; H02J 3/32; H02J 1/106;
(Continued)

(56) References Cited

U.S. PATENT DOCUMENTS

2009/0237016 A1* 9/2009 Iwashita ................. H02J 7/345
                                                        318/400.3
2010/0117568 A1* 5/2010 Iwashita ................. H02P 21/14
                                                        318/400.02
(Continued)

FOREIGN PATENT DOCUMENTS

JP        2002136165 A    5/2002
JP         200575026 A    3/2005
(Continued)

*Primary Examiner* — Rexford N Barnie
*Assistant Examiner* — David A Shiao
(74) *Attorney, Agent, or Firm* — Hauptman Ham, LLP

(57) ABSTRACT

A motor drive apparatus includes a converter; an inverter for drive; a power storage device configured to supply DC power to a direct current link or to store DC power from the direct current link; a power consumption estimation unit configured to acquire a power consumption estimation value which is an estimation value of a total power consumption at a time point later, by a predetermined time, than a value at a present time point, the total power consumption being obtained as a sum of an output of the servomotor for drive, a winding loss in the servomotor for drive, a loss in the converter and a loss in the inverter for drive; and a power storage device control unit configured to control power supply and power storage of the power storage device in accordance with the power consumption estimation value.

10 Claims, 19 Drawing Sheets

(51) Int. Cl.
*H02J 7/34* (2006.01)
*H02J 3/32* (2006.01)
*H02J 3/30* (2006.01)

(58) Field of Classification Search
CPC .......... H02J 1/14–16; H02P 3/14; H02P 5/68; H02P 5/74
See application file for complete search history.

(56) References Cited

U.S. PATENT DOCUMENTS

| | | | | |
|---|---|---|---|---|
| 2011/0313608 | A1* | 12/2011 | Izumi | E02F 9/2075 701/22 |
| 2012/0326641 | A1* | 12/2012 | Sakai | H02J 3/30 318/400.3 |
| 2013/0009576 | A1* | 1/2013 | Iwashita | H02P 27/08 318/400.3 |
| 2013/0154531 | A1* | 6/2013 | Furutani | B60L 50/40 318/400.26 |
| 2014/0210389 | A1* | 7/2014 | Niwa | H02P 3/14 318/400.3 |
| 2016/0226423 | A1* | 8/2016 | Watabu | H02P 27/06 |
| 2017/0005606 | A1* | 1/2017 | Kuroki | H02M 1/00 |
| 2018/0267502 | A1* | 9/2018 | Ikai | G05B 19/404 |
| 2019/0052119 | A1* | 2/2019 | Hendrix | B60L 50/60 |
| 2020/0198279 | A1* | 6/2020 | Masato | H02P 29/032 |

FOREIGN PATENT DOCUMENTS

| | | |
|---|---|---|
| JP | 2010115063 A | 5/2010 |
| JP | 2013-9524 A | 1/2013 |
| JP | 201317305 A | 1/2013 |
| JP | 5389302 B1 | 1/2014 |
| JP | 2016-46833 A | 4/2016 |
| JP | 2016137803 A | 8/2016 |

* cited by examiner

MOTOR DRIVE APPARATUS INCLUDING POWER STORAGE DEVICE

RELATED APPLICATIONS

The present application claims priority to Japanese Application Numbers 2019-084324, filed Apr. 25, 2019, and 2020-069213, filed Apr. 7, 2020, the disclosures of which applications are hereby incorporated by reference herein in their entirety.

BACKGROUND OF THE INVENTION

1. Field of the Invention

The present invention relates to a motor drive apparatus including a power storage device.

2. Description of the Related Art

In a motor drive apparatus for driving a servomotor provided to machines including a machine tool, a robot, etc., (hereinafter, referred to as "servomotor for drive"), AC power supplied from an AC power source is converted into DC power by a converter, the DC power is output to a direct current link, the DC power in the direct current link is further converted into AC power by an inverter, and the AC power is used as drive power for the servomotor for drive. The "direct current link" indicates a circuit part which electrically connects the DC output side of the converter and the DC input side of the inverter, and may also be referred to as a "direct current link unit", a "dc link", a "dc link unit", or a "direct current intermediate circuit". It is a common practice to provide one converter for a plurality of inverters to reduce the cost and the footprint of the motor drive apparatus. In other words, a converter configured to convert AC power supplied from an AC power source into DC power is used as a common power source unit, and a plurality of inverters for drive use the DC power that is output from the power source unit to generate AC power for driving each servomotor for drive.

In acceleration or deceleration control of the servomotor for drive by the motor drive apparatus, a power peak occurs because the AC power source is requested to output or regenerate high AC power. Especially in a motor drive apparatus including a plurality of inverters for drive, which are connected to one converter, the occurring power peak may be relatively high. Reducing the power peak is desirable, since the higher the power peak, the higher the power source capacity and the operational cost of the motor drive apparatus, and the more power problems such as power failure and flickering are likely to occur in the AC power source side.

To reduce the power peaks, in one conventionally used method, a power storage device which can store DC power in a direct current link that connects the converter to the inverter for drive in the motor drive apparatus is provided, and energy consumed or regenerated by the servomotor for drive is exchanged as appropriate via the direct current link. With this method, the power peaks can be reduced because, during deceleration of the servomotor for drive, regenerative power generated from the servomotor for drive can be stored in the power storage device, and the stored power can be reused during acceleration of the servomotor for drive. In other words, the use of a power storage device which inputs and outputs power to and from the direct current link allows even an operation (acceleration and deceleration) of the servomotor for drive which involves power consumption higher than the maximum suppliable power of the converter. Examples of the power storage device include a capacitor power storage device and a flywheel power storage device.

As an example, a press machine causes a very high maximum power consumption during a press operation and often poses a problem related to power source capacity shortage. To solve this problem, a motor drive apparatus in a press machine includes a flywheel power storage device provided in a direct current link, and the power storage device supplies power when the press machine consumes high power, which allows driving of the press machine connected to even a small-capacity power source. For example, when the servomotor for drive consumes low power, a servomotor for buffer coupled to a flywheel is rotated at a constant speed, and when the servomotor for drive consumes higher power due to, e.g., its acceleration or deceleration, the rotational speed of the servomotor for buffer is lowered, power regeneration is performed via an inverter for buffer, and DC power for driving the servomotor for drive is supplied to the direct current link. Hence, even for an acceleration and deceleration operation which consumes power higher than maximum convertible power that is the maximum power up to which the converter can perform power conversion, driving can be performed using regenerative power from the servomotor for buffer coupled to the flywheel having rotation energy.

As disclosed in, e.g., Japanese Unexamined Patent Publication No. 2013-009524, a motor drive apparatus is known to include an AC/DC converter which converts AC power from an AC power source into DC power, a DC/AC converter which converts DC power into AC power for driving a motor or converts AC power regenerated from the motor into DC power, a dc link unit which connects a DC side of the AC/DC converter to a DC side of the DC/AC converter and transfers DC power, an energy storage unit including at least one capacitor storage unit and at least one flywheel storage unit, which is connected to the dc link unit and stores the DC power from the dc link unit or supplies the DC power to the dc link unit, a motor control unit which performs control to allow the DC/AC converter to output desired AC power, in accordance with a motor operation command related to an operation of the motor, and an energy control unit which controls the energy storage unit to store the DC power from the dc link unit or supply the DC power to the dc link unit.

As disclosed in, e.g., Japanese Unexamined Patent Publication No. 2016-046833, a system for controlling a servomotor for driving an axis of industrial machinery or a machine tool is known to include a plurality of first servomotors for driving axes, a plurality of converters which convert AC voltage into DC voltage, a plurality of first inverters which receive the DC voltage from the converters and convert the DC voltage into AC voltage for driving the plurality of first servomotors or convert AC power regenerated from the first servomotors into DC power, second servomotors which rotate inertia, a plurality of second inverters which receive the DC voltage from the converters and convert the DC voltage into AC voltage for driving the second servomotors or convert AC power regenerated from the second servomotors into DC power, and a servomotor controller which controls the plurality of first servomotors and the second servomotors, wherein the second servomotors are fewer in number than the plurality of second inverters, at least one of the second servomotors includes a plurality of independent windings, and at least some of the plurality of second inverters are connected to a plurality of independent windings provided in one second servomotor.

SUMMARY OF INVENTION

In a motor drive apparatus in which a direct current link that connects a converter and an inverter for drive is provided with a power storage device in order to reduce a power peak of power source equipment, a power supply command or a power storage command is sent to the power storage device in accordance with an increase or decrease of "total power consumption" obtained as a sum of power consumed by a servomotor for drive, the inverter for drive and the converter. However, the responsivity of the power storage device to a discharge command or a power storage command is low. In other words, there exists a time delay from when the power supply command or power storage command is sent to the power storage device to when the power storage device actually starts a power supply operation or power storage operation in response to the command. Conventionally, there is a case in which a power peak fails to be decreased due to a delay in response of the power storage device. When it is not possible to decrease the power peak as scheduled, there is a possibility that the motor drive apparatus and a machine tool including the motor drive apparatus accidentally make an alarm stop, or the converter is broken.

For example, with an unexpected high load acting on the servomotor for drive, the servomotor for drive consumes more power than usual. Due to the delay in response of the power storage device, there may be a case in which power for compensating a total power consumption, which exceeds a maximum suppliable power of the converter, fails to be supplied from the power storage device. In such a case, there is a possibility that AC power that is needed for driving the servomotor for drive runs short and the motor drive apparatus and a machine tool including the motor drive apparatus make an alarm stop, or energy exceeding the maximum convertible power of the converter flows into the converter from the AC power source side and the converter is broken.

For example, as regards regenerative energy generated at a time of braking of the servomotor for drive, if the power storage device delays in recovering (storing) the energy, there is a possibility that energy exceeding the maximum convertible power of the converter flows into the converter from the direct current link side, leading to breakage of the converter.

Accordingly, in a motor drive apparatus including a power storage device that is provided to reduce a power peak of power source equipment, there is a demand for a technology which can surely reduce the power peak.

According to one aspect of the present disclosure, a motor drive apparatus includes a converter configured to perform power conversion between AC power on an AC power source side and DC power in a direct current link; an inverter for drive configured to perform power conversion between DC power in the direct current link and AC power serving as drive power or regenerative power of a servomotor for drive; a motor control unit for drive configured to control the servomotor for drive connected to the inverter for drive; a power storage device configured to supply DC power to the direct current link or to store DC power from the direct current link; a power consumption estimation unit configured to acquire a power consumption estimation value which is an estimation value of a total power consumption at a time point later, by a predetermined time, than a value at a present time point, the total power consumption being obtained as a sum of an output of the servomotor for drive, a winding loss in the servomotor for drive, a loss in the converter and a loss the inverter for drive; and a power storage device control unit configured to control power supply and power storage of the power storage device in accordance with the power consumption estimation value.

BRIEF DESCRIPTION OF THE DRAWINGS

The present invention will be more clearly understood with reference to the following accompanying drawings.

DETAILED DESCRIPTION

Figure 1:
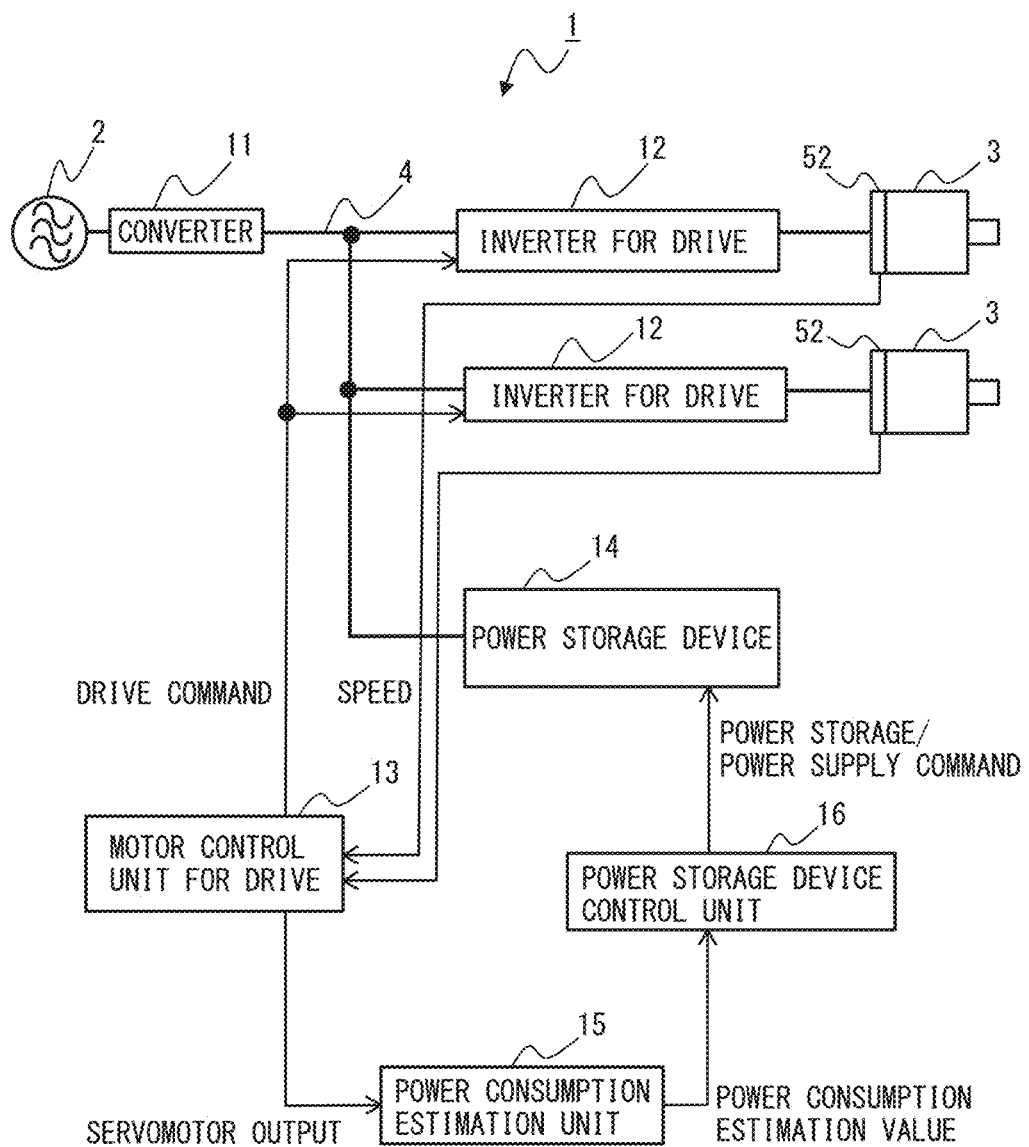
FIG. 1 is a block diagram illustrating a motor drive apparatus according to one embodiment of the present disclosure.

A motor drive apparatus including a power storage device will be described below with reference to the drawings. The same reference numerals denote the same members throughout these drawings. For the purpose of easier understanding, reduction scales in the drawings are changed as appropriate. Embodiments illustrated in the drawings are merely examples for implementation, and the embodiments are not limited to those illustrated. The "output of a servomotor for drive" includes the "power consumption of the servomotor for drive" and the "regenerative power of the servomotor for drive", and the "output of a servomotor for buffer" includes the "power consumption of the servomotor for buffer" and the "regenerative power of the servomotor for buffer". Power at a time of consumption is defined as positive, and power at a time of regeneration is defined as negative. The rotation angular speeds of the servomotor for drive and the servomotor for buffer are simply referred to as the "speed". "Power value" means "the amount of work performed by current per unit time", i.e., "work rate", which is represented by the unit of "W (watt)". "Energy value" means "the amount of work performed by current", i.e., "power amount", which is represented by the unit of "J (joule)". Accordingly, a relationship of "energy value [J]=power value [W]×time [s]" can be established.

FIG. 1 is a block diagram illustrating a motor drive apparatus according to an embodiment of the present disclosure. A case where a motor drive apparatus 1 controls two servomotors for drive 3 for driving drive axes in a machine including a machine tool or a robot will be described as an example. The number of servomotors for drive 3 does not particularly limit this embodiment and may be one, or three or more. The numbers of phases of an AC power source 2 and the servomotors for drive 3 do not particularly limit this embodiment and, for example, a three-phase or single-phase AC configuration may be used. Furthermore, the types of the servomotors for drive 3 do not particularly limit this embodiment, and induction or synchronous motors, for example, may be used. Machines equipped with the servomotors for drive 3 include, e.g., a machine tool, a robot, forging machinery, an injection molding machine, industrial machinery, various electrical appliances, an electric train, an automobile, and aircraft. Examples of the AC power source 2 include a three-phase AC 400 V power source, a three-phase AC 200 V power source, a three-phase AC 600 V power source, and a single-phase AC 100 V power source.

First, the circuit components of the motor drive apparatus 1 will be described.

As illustrated in FIG. 1, the motor drive apparatus 1 according to one embodiment of the present disclosure includes a converter 11, inverters for drive 12, a motor control unit for drive 13, a power storage device 14, a power consumption estimation unit 15, and a power storage device control unit 16. For example, the motor control unit for drive 13, power consumption estimation unit 15 and power storage device control unit 16 are provided in a numerical controller of a machine tool. Note that the motor control unit for drive 13, power consumption estimation unit 15 and power storage device control unit 16 may be provided in a processor other than the numerical controller.

The converter 11 is a rectifier which performs power conversion between AC power on the AC power source 2 side and DC power in the direct current link 4. The converter 11 is composed of a three-phase bridge circuit when a three-phase alternating current is supplied from the AC power source 2, and as a single-phase bridge circuit when a single-phase alternating current is supplied from the AC power source 2. The converter 11 is implemented as a power converter, like a 120-degree conduction rectifier circuit and a PWM switching control rectifier circuit, which can perform such bidirectional AC/DC power conversion as to convert AC power that is input from the AC power source side 2 into DC power and output the DC power to the DC side, and as to convert, at a time of power regeneration, DC power of the direct current link 4 into AC power and output the AC power to the AC power source 2 side. When the converter 11 is implemented as, e.g., a PWM switching control rectifier circuit, it is implemented as a bridge circuit of switching elements and diodes connected in antiparallel with the switching elements and performs bidirectional AC/DC power conversion by ON/OFF control of each switching element in accordance with a drive command received from, for example, a host controller. Examples of the switching element may include a unipolar transistor such as a field effect transistor (FET), a bipolar transistor, an insulated gate bipolar transistor (IGBT), a thyristor, and a gate turn-off thyristor (GTO), but the type of switching element itself does not limit this embodiment, and other types of switching element may be used.

For the converter 11, "maximum suppliable supply" is defined as maximum power up to which AC power can be converted into DC power and the DC power can be supplied to the direct current link 4, and "maximum regenerable power" is defined as maximum power up to which DC power in the direct current link 4 can be converted into AC power and regenerated to the AC power source 2 side. The maximum suppliable power and maximum regenerable power are generally defined as specification data about conversion capacity of the converter 11, and specified in, e.g., a specification table or an instruction manual of the converter 11. Hereinafter, in the present specification, the maximum suppliable power and maximum regenerable power of the converter 11 are collectively referred to as the "maximum convertible power".

The converter 11 is connected to the inverters for drive 12 through the direct current link 4. The direct current link 4 in general includes a direct current link capacitor (also referred to as "smoothing capacitor"), though not illustrated in FIG. 1. The direct current link capacitor has the functions of storing DC power in the direct current link 4 and of suppressing ripples of the DC output of the converter 11.

The inverters for drive 12 constitute servo-amplifiers which convert DC power of the direct current link 4 into AC power and supply the AC power as drive power to the servomotors for drive 3, in order to drive the servomotors for derive 3. The inverters for drive 12 convert power between the DC power of the direct current link 4 and AC power serving as drive power or regenerative power for the servomotors for drive 3. The servomotor for drive 3 generally includes at least one winding, and one servo-amplifier for one inverter for drive 12 is needed per winding in the servomotor for drive 3 in order to drive the servomotor for drive 3. FIG. 1 represents servomotors for drive 3 of the single-winding type as an example, and accordingly, one inverter for drive 12 is connected to each servomotor for drive 3.

The drive inverter 12 for drive is implemented as a bridge circuit of switching elements and diodes connected in anti-parallel with the switching elements, and ON/OFF control of each switching element is performed based on PWM switching control of, e.g., a triangular wave comparison scheme. The inverter for drive 12 is implemented as a three-phase bridge circuit when the servomotor for drive 3 serves as a three-phase motor, and implemented as a single-phase bridge circuit when the servomotor for drive 3 serves as a single-phase motor. Examples of the switching element may include a unipolar transistor such as an FET, a bipolar transistor, an IGBT, a thyristor, and a GTO, but the type of switching element itself does not limit this embodiment, and other types of switching element may be used.

The inverters for drive 12 convert power between the DC power of the direct current link 4 and AC power serving as drive power or regenerative power for the servomotors for drive 3 by ON/OFF control of each switching element in accordance with a drive command received from a motor control unit for drive 13 as will be described later. More specifically, the inverters for drive 12 perform the switching operation of the internal switching elements in accordance with a drive command received from the motor control unit for drive 13 so as to convert DC power supplied from the converter 11 via the direct current link 4 into AC power having desired voltage and a desired frequency for driving the servomotors for drive 3 (inversion operation). Thereby, the servomotors for drive 3 are rotated and driven. Although regenerative power may be generated during deceleration of the servomotors for drive 3, the switching operation of the internal switching elements is performed in accordance with a drive command received from the motor control unit for drive 13 so as to convert the AC regenerative power generated in the servomotors for drive 3 into DC power and return the DC power to the direct current link 4 (rectification operation).

The motor control unit for drive 13 controls the servomotors for drive 3, each of which is connected to the inverters for drive 12, to operate (i.e., rotate) in accordance with a predetermined operation pattern. The operation pattern of the servomotors for drive 3 is formed by combining acceleration, deceleration, constant-speed rotation, and stop as appropriate in accordance with the operation details of the machine equipped with the servomotors for drive 3. The operation pattern of the servomotors for drive 3 is defined by an operation program for the servomotors for drive 3. For example, when the servomotors for drive 3 are provided in a machine tool, an operation program for the servomotors for drive 3 is defined as one of machining programs for the machine tool.

In this manner, the servomotors for drive 3 are controlled in speed, torque, or rotor position, based on, e.g., variable-voltage, variable-frequency AC power supplied from the inverters for drive 12. Thus, control of the servomotors for drive 3 by the motor control unit for drive 13 is eventually implemented by controlling the power conversion operation of the inverters for drive 12. In other words, the motor control unit for drive 13 controls the servomotors for drive 3 to operate in accordance with a predetermined operation pattern by controlling power conversion in the inverters for drive 12. More specifically, the following operation is performed: The motor control unit for drive 13 generates a drive command for controlling the speed, torque, or rotor position of the servomotors for drive 3, based on, e.g., the speed of the servomotors for drive 3 detected by a speed detector 52 (speed feedback), current flowing through the winding of the servomotors for drive 3 (current feedback), a predetermined torque command, and an operation program for the servomotors for drive 3. The power conversion operation by the inverters for drive 12 is controlled in accordance with the drive command generated by the motor control unit for drive 13. Note that the configuration of the motor control unit for drive 13 defined herein is merely an example, and the configuration of the motor control unit for drive 13 may be defined using terms such as a position command generation unit, a torque command generation unit, and a switching command generation unit.

The motor drive apparatus 1 includes the power storage device 14 in order to allow driving of the servomotors for drive 3 with an output higher than the maximum convertible power of the converter 11.

The power storage device 14 supplies DC power to the direct current link 4 (power supply) and stores DC power from the direct current link 4 (power storage). The power supply operation and power storage operation of the power storage device 14 are controlled by the power storage device control unit 16. A base holding energy is defined as a reference value (a target value) of energy that the power storage device 14 is supposed to store. In accordance with control by the power storage device control unit 16, the power storage device 14 stores power so that the holding energy becomes equivalent to the base holding energy as the target value. For example, when the servomotors for drive 3 are not operating and input/output of power by the power storage device 14 is not particularly required, the holding energy of the power storage device 14 is maintained at the base holding energy. When the power supply operation of the power storage device 14 is performed, the holding energy of the power storage device 14 decreases to a smaller value than the base holding energy; however, when the power storage operation of the power storage device 14 is performed, the holding energy of the power storage device 14 increases and restores to the base holding energy as the target value.

Figure 2:
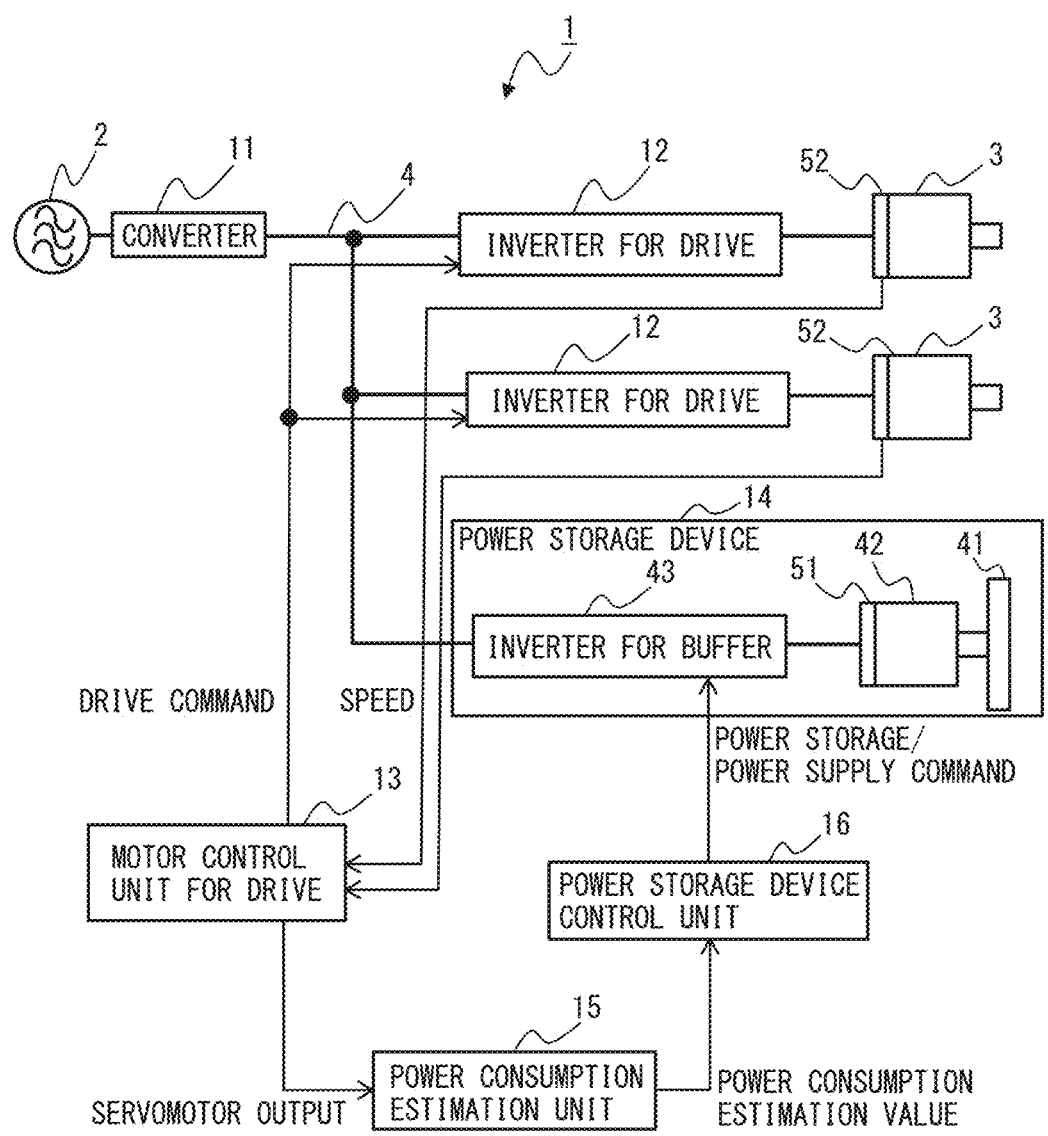
FIG. 2 is a block diagram illustrating the motor drive apparatus according to one embodiment of the present disclosure, which includes a flywheel power storage device.
Figure 3:
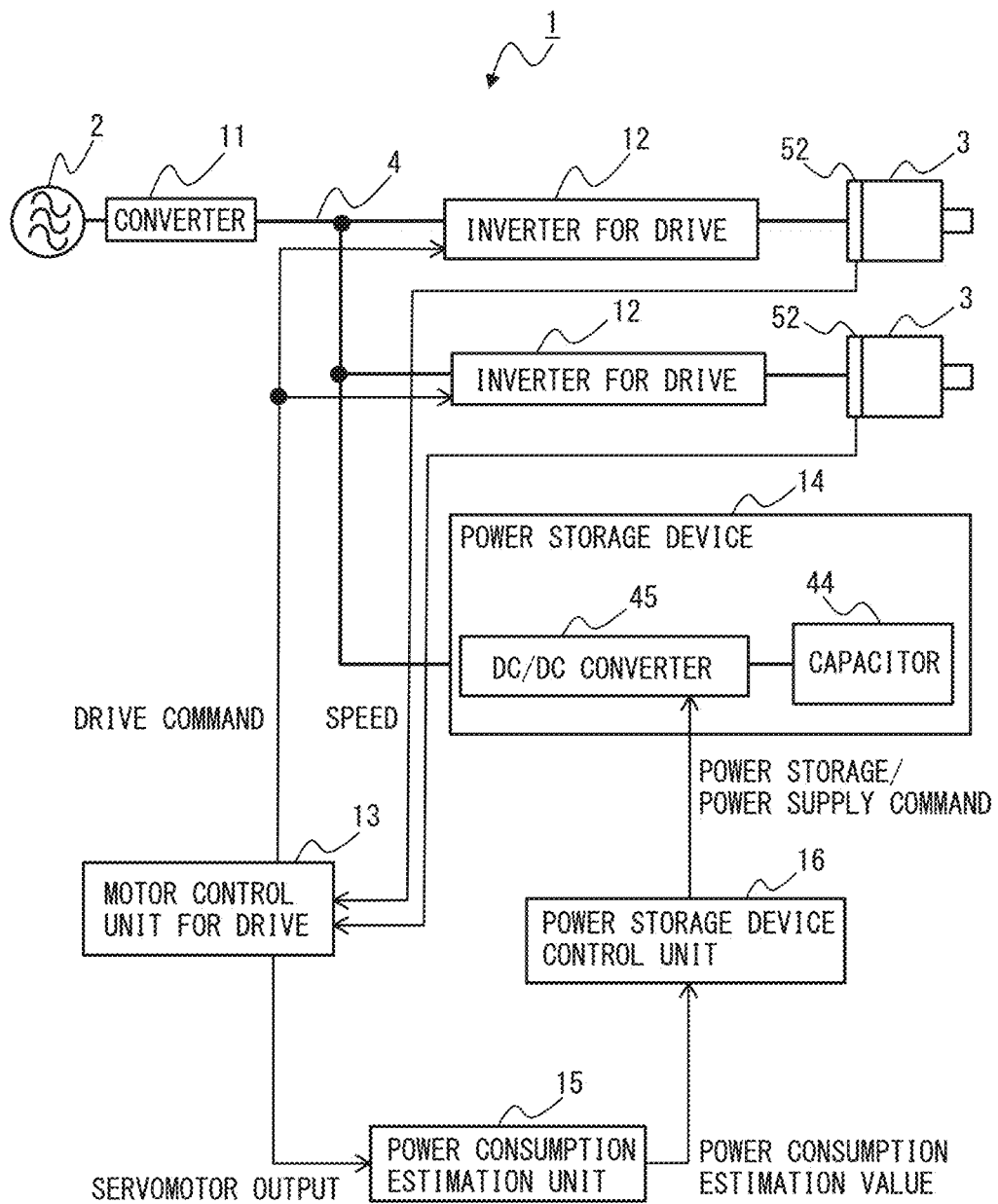
FIG. 3 is a block diagram illustrating the motor drive apparatus according to one embodiment of the present disclosure, which includes a capacitor power storage device.

Examples of the power storage device 14 include a flywheel power storage device as illustrated in FIG. 2 and a capacitor power storage device as illustrated in FIG. 3.

FIG. 2 is a block diagram illustrating the motor drive apparatus according to an embodiment of the present disclosure, which includes a flywheel power storage device. The flywheel power storage device 14 includes a flywheel 41, a servomotor for buffer 42, and an inverter for buffer 43.

The flywheel 41 can store rotation energy, which is also called inertia.

The servomotor for buffer 42 is used to rotate the flywheel 41, and the flywheel 41 is connected to the rotation shaft of the servomotor for buffer 42. Rotation energy can be stored in the flywheel 41 by rotating the servomotor for buffer 42. The number of phases of the servomotor for buffer 42 does not particularly limit this embodiment, and, for example, three phases or a single phase may be used. A speed detector 52 is provided in the servomotor for buffer 42, and the (rotor) speed of the servomotor for buffer 42 detected by the speed detector 52 is used to control the power storage device 14 by the power storage device control unit 16.

The inverter for buffer 43 converts power between DC power in the direct current link 4 and AC power serving as drive power or regenerative power for the servomotor for buffer 42 by ON/OFF control of each switching element in accordance with a power storage command or power supply command received from the power storage device control unit 16. The inverter for buffer 43 is implemented as a bridge circuit of switching elements and diodes connected in anti-parallel with the switching elements. The inverter for buffer 43 is implemented as a three-phase bridge circuit when the servomotor for buffer 42 serves as a three-phase motor, and implemented as a single-phase bridge circuit when the servomotor for buffer 42 serves as a single-phase motor. Examples of the switching element may include a unipolar transistor such as an FET, a bipolar transistor, an IGBT, a thyristor, and a GTO, but the type of switching element itself does not limit this embodiment, and other types of switching element may be used. For example, ON/OFF control of each switching element in the inverter for buffer 43 is performed in accordance with a PWM switching signal obtained by comparing a received drive command with a triangular carrier.

By controlling power conversion of the inverter for buffer 43 by the power storage device control unit 16, the servomotor for buffer 42 connected to the flywheel 41 rotates with acceleration or deceleration or rotates at a constant speed, so that DC power to be stored or supplied by the power storage device 14 (DC power to be input to or output from the direct current link 4 by the power storage device 14) is adjusted. More specifically, the following operation is performed.

When power storage of the power storage device 14 is performed, the inverter for buffer 43 performs an inversion operation for converting the DC power in the direct current link 4 into AC power in accordance with a power storage command received from the power storage device control unit 16. Hence, electrical energy from the direct current link 4 is fed to the servomotor for buffer 42 side and acts to rotate the servomotor for buffer 42 connected to the flywheel 41. In this manner, in the flywheel power storage device 14, electrical energy flowing from the direct current link 4 is converted into rotation energy of the flywheel 41 and stored.

When power supply of the power storage device 14 is performed, the inverter for buffer 43 performs a rectification operation for converting AC regenerative power into DC power by generating the AC regenerative power by decelerating the servomotor for buffer 42 connected to the flywheel 41 in accordance with a power supply command received from the power storage device control unit 16. Thereby, rotation energy stored in the flywheel 41 is converted into electrical energy and supplied to the direct current link 4.

FIG. 3 is a block diagram illustrating a motor drive apparatus according to an embodiment of the present disclosure, which includes a capacitor power storage device. The capacitor power storage device 14 includes a capacitor 44 and a DC/DC converter 45 configured to convert power between DC power in the direct current link 4 and DC power stored in the capacitor 44.

Examples of the DC/DC converter 45 include a DC/DC boost and buck chopper circuit. The amount of DC power to be stored or supplied by the power storage device 14 (the amount of DC power to be input to or output from the direct current link 4 by the power storage device 14) is adjusted by controlling a boosting and bucking operation of the DC/DC converter 45 by the power storage device control unit 16. More specifically, the following operation is performed.

When power storage of the power storage device 14 is performed, the DC/DC converter 45 is controlled by the power storage device control unit 16 to make DC voltage on the capacitor 44 side lower than DC voltage on the direct current link 4 side in accordance with a power storage command received from the power storage device control unit 16. Thereby, electrical energy flows from the direct current link 4 into the capacitor 44, and the power storage device 14 stores power.

When power supply of the power storage device 14 is performed, the DC/DC converter 45 is controlled by the power storage device control unit 16 to make DC voltage on the capacitor 44 side higher than DC voltage on the direct current link 4 side in accordance with a power supply command received from the power storage device control unit 16. Thereby, electrical energy flows from the capacitor 44 into the direct current link 4, and the power storage device 14 supplies power.

In the motor drive apparatus 1, with the provision of the power storage device 14 which performs the above-described operation, during acceleration of the servomotors for drive 3, in addition to energy supplied from the converter 11, energy stored in the power storage device 14 is supplied to the servomotors for drive 3 and is used as power for accelerating the servomotors for drive 3. During deceleration of the servomotors for drive 3, energy regenerated from the servomotors for drive 3 is stored in the power storage device 14. Since the energy stored in the power storage device 14 is used to drive the servomotors for drive 3 in addition to power supplied from the converter 11, the servomotors for drive 3 can be driven at an output higher than the maximum convertible power of the converter 11, and power peaks can thus be reduced. Reducing power peaks can curb the power source capacity and the operational cost of the motor drive apparatus 1 and can even prevent power failure and flickering of the AC power source 2 side.

The power storage device 14 performs a power supply operation and a power storage operation in accordance with a command from the power storage device control unit 16. The power storage device 14 has low responsivity to a discharge command or a power storage command, and there exists a time delay from when a power supply command or power storage command is sent to the power storage device 14 to when the power storage device 14 actually starts a power supply operation or power storage operation in response to the command. For example, when the power storage device 14 is the flywheel power storage device illustrated in FIG. 2, the servomotor for buffer 42 starts acceleration or deceleration with a temporal delay from the start of the acceleration or deceleration command to the servomotor for buffer 42 due to the inertial of the servomotor for buffer 42 or the control performance of the inverter for buffer 43. For example, when the power storage device 14 is the capacitor power storage device illustrated in FIG. 3, the capacitor 44 is charged or discharged to a desired voltage, with a temporal delay from the command start for charging or discharging the capacitor 44 due to the charge/discharge characteristics of the capacitor 44 or the control performance of the DC/DC converter 45 connected to the capacitor. Even if a power supply command is sent to the power storage device 14 at such a timing that "total power consumption at present time", which is obtained as a sum of an output of the servomotor for drive 3, a winding loss the servomotor for drive 3, a loss in the converter 11 and a loss in the inverter for drive 12, exceeds the maximum suppliable power of the converter 11, since there is a time delay from the start of the power supply command to the actual start of the power supply operation by the power storage device 14, there occurs a time when the total power consumption exceeds the maximum suppliable power of the converter 11 and a power peak may not be reduced. Similarly, as regards the power storage operation of the power storage device 14, since there is a time delay from the start of the power storage command to the actual start of the power storage operation by the power storage device 14, there occurs a time when the total power consumption exceeds the maximum regenerable power of the converter 11 and a power peak may not be reduced. Thus, in the present embodiment, a power consumption estimation value, which is an estimation value of the total power consumption at a time later than a present time point by a predetermined time, is calculated, the total power consumption being obtained as the sum of the output of the servomotor for drive 3, the winding loss in the servomotor for drive 3, the loss in the converter 11 and the loss in the inverter for drive 12, and the power supply and power storage of the power storage device 14 are controlled in accordance with the power consumption estimation value. In other words, in the present embodiment, by taking into account "response delay time" which is "time from when the power storage device control unit 16 outputs a power supply command or a power storage command to the power storage device 14 to when the power storage device 14 actually starts power supply or power storage", a total power consumption at a time point later than the present time point by "time corresponding to the response delay time" is estimated from known data relating to a total power consumption before the present time point, and the power storage device control unit 16 controls the power supply and power storage of the power storage device 14, based on a comparison result between the estimation value of the total power consumption and a threshold for power supply and a threshold for power storage. The response delay time from when the power storage device control unit 16 outputs a power supply command or a power storage command to the power storage device 14 to when the power storage device 14 actually starts power supply or power storage may be measured in advance, or may be measured in real time by providing a measuring unit, as will be described later. A description will now be given of the case in which the above-described "predetermined time" is set to be equal to the length of the response delay time of the power storage device 14.

The power consumption estimation unit 15 acquires a power consumption estimation value that is an estimation value of the total power consumption at a time later than a present time point by a predetermined time, the total power consumption being obtained as the sum of an output of the servomotor for drive 3, a winding loss in the servomotor for drive 3, a loss in the converter 11 and a loss in the inverter for drive 12. An estimation value acquisition process by the power consumption estimation unit 15 is executed in every predetermined control cycle. The estimation value acquisition process by the power consumption estimation unit 15 is executed before a power storage device control process by the power storage device control unit 16. The details of the estimation value acquisition process by the power consumption estimation unit 15 will be described later.

The power storage device control unit 16 controls power supply and power storage of the power storage device in accordance with the power consumption estimation value. In one control cycle, the power consumption estimation unit 15 calculates the power consumption estimation value, and the power storage device control unit 16 executes a command generation process by using the power consumption estimation value. More specifically, the following operation is performed.

The power storage device control unit 16 compares, in every control cycle, the power consumption estimation value and the threshold for power supply, and, as a result of the comparison, when the power consumption estimation value is determined to exceed the threshold for power supply, the power storage device control unit 16 outputs a power supply command to the power storage device 14 and controls the power storage device 14, thus causing the power storage device 14 to supply DC power to the direct current link 4. In addition, while controlling the power storage device 14 so as to perform the power supply operation, the power storage device control unit 16 compares, in every control cycle, the power consumption estimation value and the threshold for power supply, and, as a result of the comparison, when the power consumption estimation value is determined to fall below the threshold for power supply, the power storage device control unit 16 stops the generation of the power supply command to the power storage device 14 and causes the power storage device 14 to finish the power supply operation of DC power to the direct current link 4.

The threshold for supply may be set based on the maximum suppliable power that is the maximum convertible power with respect to the conversion operation of the converter 11. For example, when a difference between the maximum suppliable power of the converter 11 and the power consumption estimation value calculated by the power consumption estimation unit 15 is negative, the power consumption estimation value exceeds the maximum suppliable power at the time of the conversion of the converter 11. Thus, since it is possible that the entirety of the actual total power consumption may not be provided by the energy which the converter 11 takes from the AC power source 2 side into the direct current link 4, the deficient power is to be supplemented by DC power which is supplied from the power storage device 14 to the direct current link 4. The threshold for supply is set as a reference value for judging whether or not there is a situation in which DC power is to be supplied from the power storage device 14 to the direct current link 4 because the power consumption estimation value exceeds the maximum suppliable power at the time of conversion of the converter 11.

The power storage device control unit 16 compares, in every control cycle, the power consumption estimation value and the threshold for power storage, and, as a result of the comparison, when the power consumption estimation value is determined to fall below the threshold for power storage, the power storage device control unit 16 outputs a power storage command to the power storage device 14 and controls the power storage device 14, thus causing the power storage device 14 to store DC power from the direct current link 4. In addition, while controlling the power storage device 14 so as to perform the power storage operation, the power storage device control unit 16 compares, in every control cycle, the power consumption estimation value and the threshold for power storage, and, as a result of the comparison, when the power consumption estimation value is determined to exceed the threshold for power storage, the power storage device control unit 16 stops the generation of the power storage command to the power storage device 14 and causes the power storage device 14 to finish the power storage operation of DC power from the direct current link 4.

The threshold for power storage may be set based on the maximum regenerable power that is the maximum convertible power with respect to the inversion operation of the converter 11. For example, when a difference between the absolute value of the maximum regenerable power of the converter 11 and the absolute value of the power consumption estimation value which relates to regeneration and is calculated by the power consumption estimation unit 15 is negative, it is possible that the actual total power consumption exceeds the maximum regenerable power at the time of the inversion of the converter 11, and thus the excessive power is to be stored in the power storage device 14. The threshold for power storage is set as a reference value for judging whether or not there is a situation in which DC power from the direct current link 4 is to be stored in the power storage device 14 because the power consumption estimation value relating to regeneration exceeds the maximum regenerable power of the converter 11.

Figure 4:
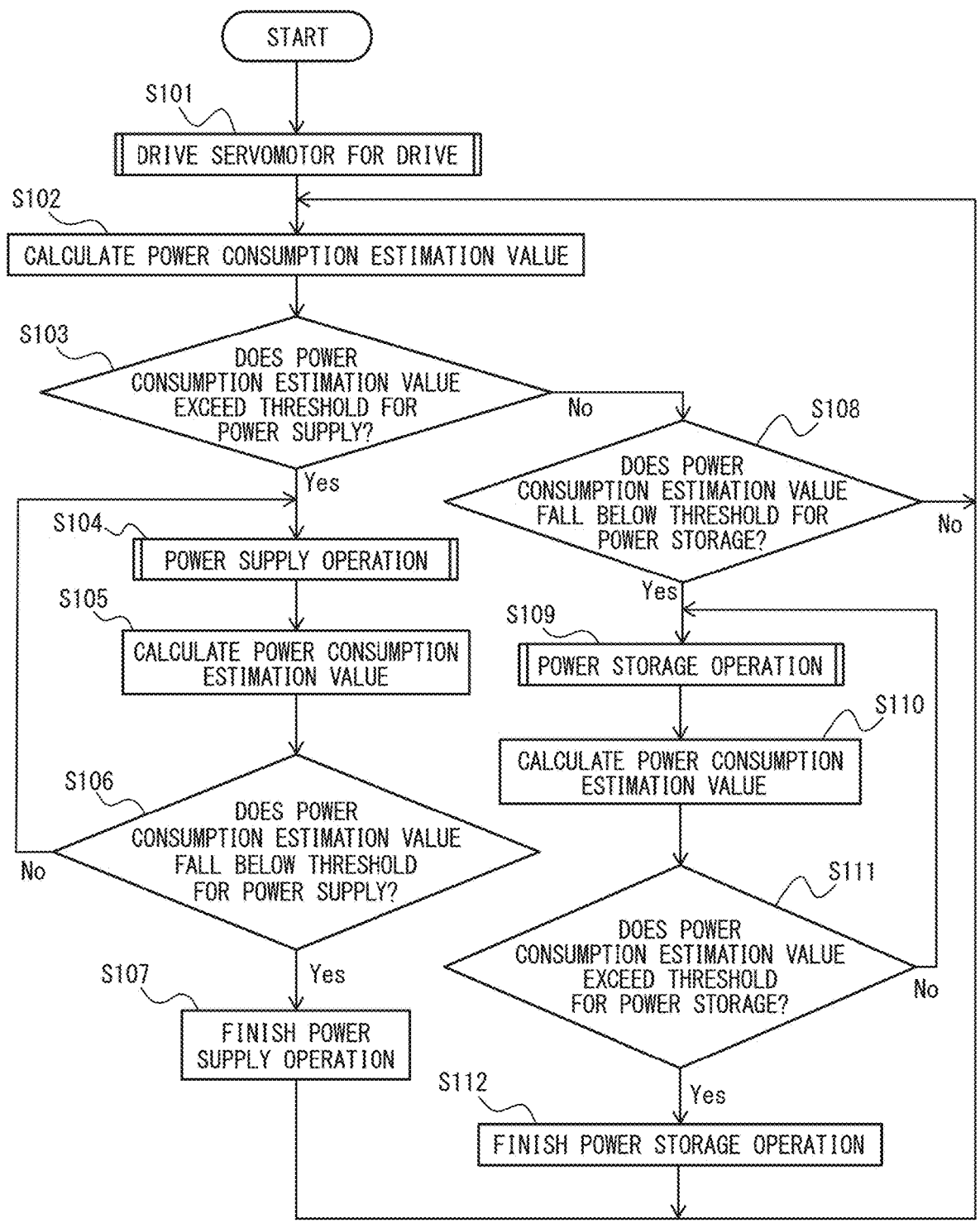
FIG. 4 is a flowchart illustrating the operation sequence of the motor drive apparatus according to one embodiment of the present disclosure.

FIG. 4 is a flowchart illustrating the operation sequence of the motor drive apparatus according to one embodiment of the present disclosure. The process of steps S101 to S112 is executed in a predetermined control cycle.

In step S101, the motor control unit for drive 13 generates a drive command for controlling the speed, torque or rotor position of the servomotor for drive 3, based on the speed (speed feedback) of the servomotor for drive 3, which is detected by the speed detector 52, the current (current feedback) flowing in the winding of the servomotor for drive 3, a predetermined torque command, and an operation program of the servomotor for drive 3. Based on the drive command generated by the motor control unit for drive 13, the power conversion operation by the inverters for drive 12 is controlled. In order to drive the servomotors for drive 3, the inverters for drive 12 convert DC power in the direct current link 4 into AC power, and supplies the AC power to the servomotors for drive 3 as drive power, or converts AC regenerative power generated by the servomotors for drive 3 at a time of braking into DC power, and returns the DC power to the direct current link 4.

In step S102, the power consumption estimation unit 15 acquires the power consumption estimation value that is an estimation value of the total power consumption at a time later than the present time point by a predetermined time, the total power consumption being obtained as the sum of an output of the servomotor for drive 3, a winding loss in the servomotor for drive 3, a loss in the converter 11 and a loss in the inverter for drive 12.

In step S103, the power storage device control unit 16 compares the power consumption estimation value and the threshold for power supply, and determines whether or not the power consumption estimation value exceeds the threshold for power supply. When the power storage device control unit 16 determines that the power consumption estimation value exceeds the threshold for power supply, the process advances to step S104, or, otherwise, advances to step S108.

In step S104, the power storage device control unit 16 outputs a power supply command to the power storage device 14 and controls the power storage device 14, thus causing the power storage device 14 to supply DC power to the direct current link 4.

In step S105, the power consumption estimation unit 15 acquires the power consumption estimation value that is the estimation value of the power consumption estimation value at a time later than the present time point by the predetermined time, the total power consumption being obtained as the sum of the output of the servomotor for drive 3, the winding loss in the servomotor for drive 3, the loss in the converter 11 and the loss in the inverter for drive 12.

In step S106, the power storage device control unit 16 compares the power consumption estimation value and the threshold for power supply, and determines whether or not the power consumption estimation value falls below the threshold for power supply. When the power storage device control unit 16 determines that the power consumption estimation value falls below the threshold for power supply, the process advances to step S107, or, otherwise, returns to step S104.

In step S107, the power storage device control unit 16 stops the generation of the power supply command to the power storage device 14 and causes the power storage device 14 to finish the power supply operation of DC power to the direct current link 4. After step S106, the process returns to step S102.

When the power storage device control unit 16 does not determine in step S103 that the power consumption estimation value exceeds the threshold for power supply, the power storage device control unit 16 compares, in step S108, the power consumption estimation value and the threshold for power storage, and determines whether or not the power consumption estimation value falls below the threshold for power storage. When the power storage device control unit 16 determines that the power consumption estimation value falls below the threshold for power storage, the process advances to step S109, or, otherwise, returns to step S102.

In step S109, the power storage device control unit 16 outputs a power storage command to the power storage device 14 and controls the power storage device 14, thus causing the power storage device 14 to store DC power from the direct current link 4.

In step S110, the power consumption estimation unit 15 acquires the power consumption estimation value that is the estimation value of the power consumption estimation value at a time later than the present time point by the predetermined time, the total power consumption being obtained as the sum of the output of the servomotor for drive 3, the winding loss in the servomotor for drive 3, the loss in the converter 11 and the loss in the inverter for drive 12.

In step S111, the power storage device control unit 16 compares the power consumption estimation value and the threshold for power storage, and determines whether or not the power consumption estimation value exceeds the threshold for power storage. When the power storage device control unit 16 determines that the power consumption estimation value exceeds the threshold for power supply, the process advances to step S112, or, otherwise, returns to step S109.

In step S112, the power storage device control unit 16 stops the generation of the power storage command to the power storage device 14 and causes the power storage device 14 to finish the power storage operation of DC power from the direct current link 4. After step S112, the process returns to step S102.

In this manner, the estimation value acquisition process (steps S102, S105, S110) by the power consumption estimation unit 15 is executed without fail before the power storage device control process (steps S103 and S104, steps S106 and S107, steps S108 and S109, and steps S111 and S112) by the power storage device control unit 16. Since the power storage device control process by the power storage device control unit 16 is executed in every predetermined control cycle, the estimation value acquisition process by the power consumption estimation unit 15 is executed once in the control cycle without fail.

Note that the process of step S103 and subsequent steps S104 to S107 and the process of step S108 and subsequent steps S109 to S112 may be executed in a reversed order. In other words, the power storage device control unit 16 may compare the power consumption estimation value and the threshold for power storage, and may determine whether or not the power consumption estimation value falls below the threshold for power storage, and when the power storage device control unit 16 does not determine that the power consumption estimation value falls below the threshold for power storage, the power storage device control unit 16 may subsequently compare the power consumption estimation value and the threshold for power supply, and may determine whether or not the power consumption estimation value exceeds the threshold for power supply.

Next, some modes of the power consumption estimation unit 15 in the motor drive apparatus 1 according to one embodiment of the present disclosure will successively be described.

A power consumption estimation unit 15 according to a first mode calculates a total power consumption which is obtained as a sum of an output of the servomotor for drive 3, a winding loss in the servomotor for drive 3, a loss in the converter 11 and a loss in the inverter for drive 12 at a present time point, and acquires a power consumption estimation value which is an estimation value later than the value of the total power consumption at the present time point by a predetermined time.

Figure 5:
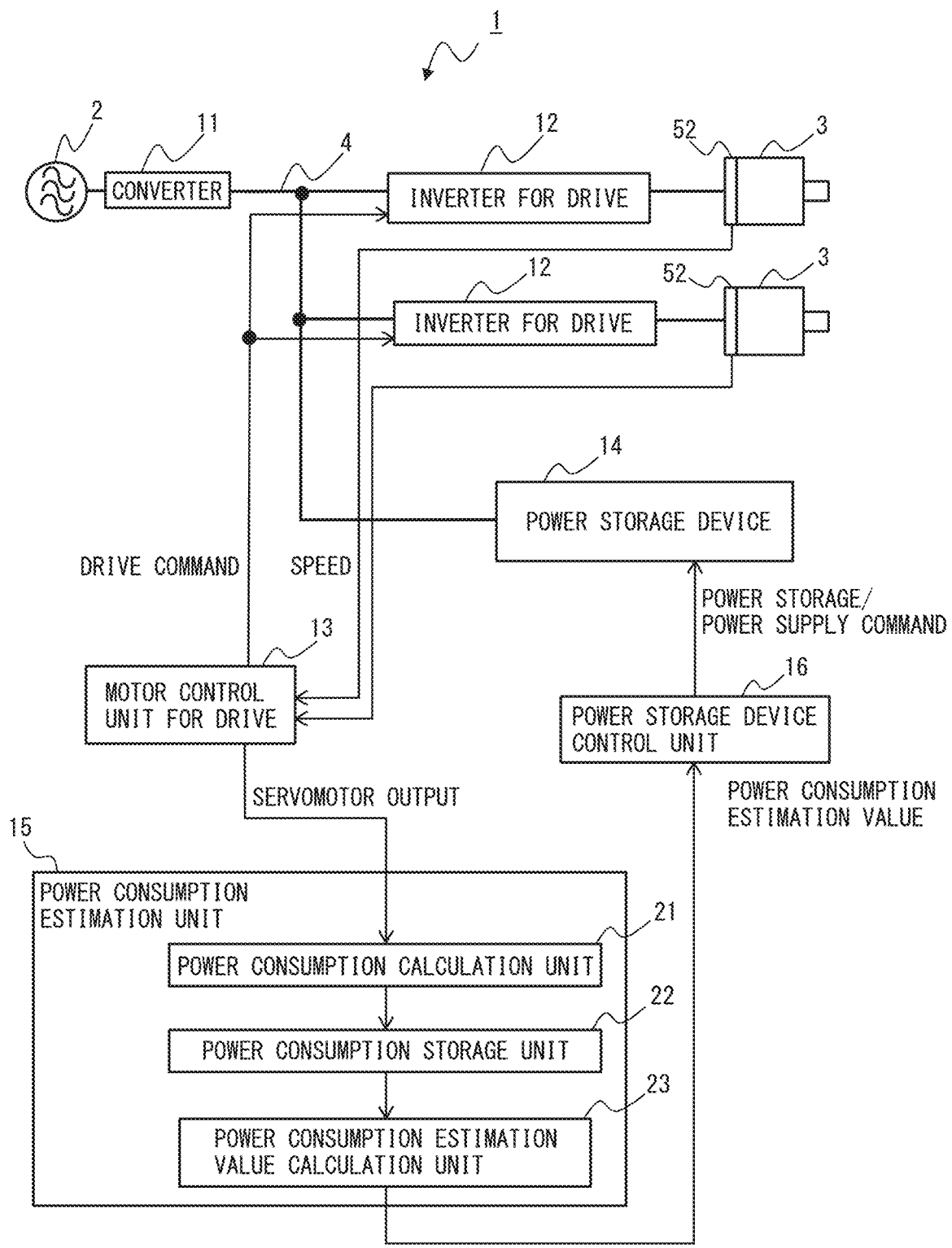
FIG. 5 is a block diagram illustrating the motor drive apparatus according to one embodiment of the present disclosure, which includes a power consumption estimation unit according to a first mode.

FIG. 5 is a block diagram illustrating the motor drive apparatus according to one embodiment of the present disclosure, which includes the power consumption estimation unit according to the first mode.

The power consumption estimation unit 15 includes a power consumption calculation unit 21, a power consumption storage unit 22, and a power consumption estimation value calculation unit 23.

The power consumption calculation unit 21 calculates a total power consumption which is obtained as a sum of an output of the servomotor for drive 3, a winding loss in the servomotor for drive 3, a loss in the converter 11 and a loss in the inverter for drive 12 at a present time point. The loss in each of the converter 11 and the inverter for drive 12 includes a switching loss and a resistance loss in the main circuit thereof, and may be measured by a publicly known method. The output of the servomotor for drive 3 at the present time point can be calculated by multiplication between the rotational speed of the servomotor for drive 3, which is detected by the speed detector 52, and the torque of the servomotor for drive 3. When the servomotor for drive 3 is accelerated, the servomotor for drive 3 consumes AC power supplied from the inverter for drive 12, and the output of the servomotor for drive 3 at the time of consuming power is defined as "positive". Accordingly, when power is regenerated by the deceleration of the servomotor for drive 3, the output of the servomotor for drive 3 is "negative". In usual cases, since the winding loss in the servomotor for drive 3, the loss in the converter 11 and the loss in the inverter for drive 12 are smaller than the absolute value of the output of the servomotor for drive 3, the influence of the output of the servomotor for drive 3 is dominant in the total power consumption. Accordingly, the positive/negative (consumption or regeneration) of the output of the servomotor for drive 3 substantially corresponds to the positive/negative of the total power consumption. As exemplarily illustrated in FIG. 1, when a plurality of inverters for drive 12 and a plurality of servomotors for drive 3 are provided, the power consumption calculation unit 21 calculates, as the total power consumption, the sum of the outputs of the servomotors for drive 3, the winding losses in the servomotors for drive 3, the loss in the converter 11 and the losses in the inverters for drive 12.

Since losses exist also in the inverter for buffer 43 and DC/DC converter 45 in the power storage device 14, the power consumption calculation unit 21 may calculate, as the total power consumption, a sum in which the loss in the inverter for buffer 43 (in the case of the flywheel power storage device) or the DC/DC converter 45 (in the case of the capacitor power storage device) is further added to the sum of the output of the servomotor for drive 3, the winding loss in the servomotor for drive 3, the loss in the converter 11 and the loss in the inverter for drive 12. The loss in each of the inverter for buffer 43 and DC/DC converter 45 includes a switching loss and a resistance loss in the main circuit thereof, and may be measured by a publicly known method. When a plurality of inverters for buffer 43 or a plurality of DC/DC converters 45 are provided, the power consumption calculation unit 21 may calculate, as the total power consumption, a sum in which the losses in the inverters for buffer 43 or DC/DC converters 45 are further added to the sum of the output of the servomotor for drive 3, the winding loss in the servomotor for drive 3, the loss in the converter 11 and the loss in the inverter for drive 12.

The power consumption storage unit 22 stores a value of the total power consumption calculated by the power consumption calculation unit. The power consumption storage unit 22 is composed of, for example, an electrically erasable programmable nonvolatile memory such as an EEPROM (trademark), or a random access memory which is capable of high-speed read/write, such as a DRAM or an SRAM.

The power consumption estimation value calculation unit 23 calculates a power consumption estimation value which is an estimation value later than a value at the present time point by a predetermined time, based on at least two values of total power consumption at or before the present time point, the at least two values being stored in the power consumption storage unit 22. For example, the power consumption estimation value calculation unit 23 calculates an approximate straight line by using at least two values of total power consumption at or before the present time point, which are stored in the power consumption storage unit 22, estimates a total power consumption at a time point later than the present time point by a predetermined time, and outputs the estimated total power consumption as the power consumption estimation value. As the "predetermined time" that is used when the power consumption estimation value calculation unit 23 calculates the power consumption estimation value, a "response delay time from when the power storage device control unit 16 outputs a power supply command or a power storage command to the power storage device 14 to when the power storage device 14 actually starts power supply or power storage" is set.

Figure 6A:
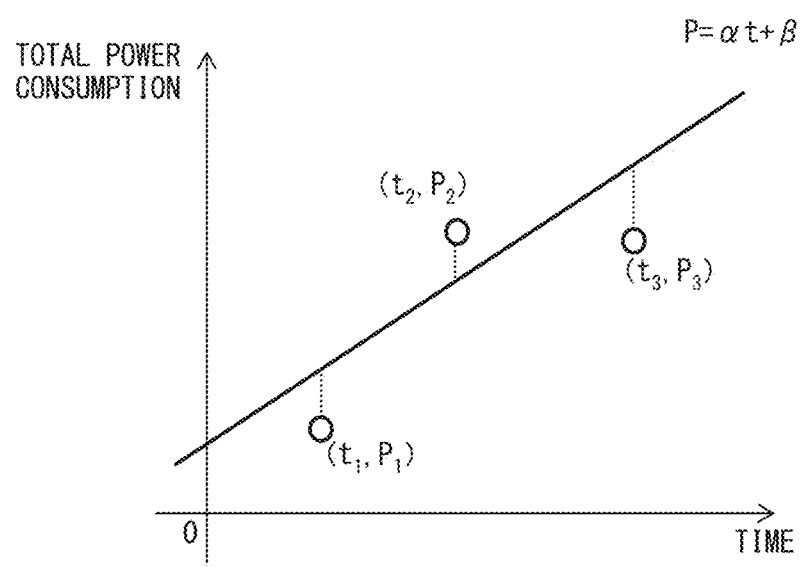
FIG. 6A is a view for explaining an approximate straight line for calculating an estimation value, FIG. 6A illustrating a case of using a least squares method.
Figure 6B:
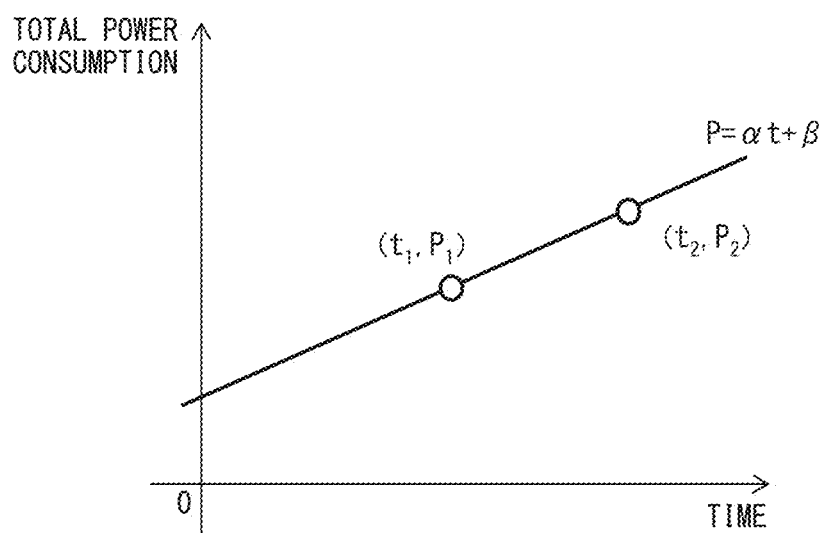
FIG. 6B is a view for explaining an approximate straight line for calculating an estimation value, FIG. 6B illustrating a case of using linear approximation.

FIG. 6A is a view for explaining an approximate straight line for calculating an estimation value, FIG. 6A illustrating a case of using a least squares method. FIG. 6B is a view for explaining an approximate straight line for calculating an estimation value, FIG. 6B illustrating a case of using linear approximation. When a power consumption estimation value at time instant t is P, the approximate straight line for calculating the estimation value is expressed as in equation 1 below.

[Equation 1]

$$P = \alpha t + \beta \quad (1)$$

For example, when a gradient $\alpha$ and an intercept $\beta$ of an approximate straight line expressed in equation 1 are calculated by using a least squares method, three values of total power consumption at or before the present time point, which are stored in the power consumption storage unit 22, are used. The three values of total power consumption "at or before" the present time point, which are used for calculating the approximate straight line, may or may not include the value of total power consumption at the present time point. In FIG. 6A, for example, it is assumed that a time instant of the present time point is $t_3$. It is assumed that a total power consumption at time instant $t_3$, which is calculated by the power consumption calculation unit 21 and stored in the power consumption storage unit 22 and is obtained as the sum of the output of the servomotor for drive 3, the winding loss in the servomotor for drive 3, the loss in the converter 11 and the loss in the inverter for drive 12, is $P_3$; a total power consumption at time instant $t_2$ before time instant $t_3$, which is calculated by the power consumption calculation unit 21 and stored in the power consumption storage unit 22, is $P_2$; and a total power consumption at time instant $t_1$ before time instant $t_2$, which is calculated by the power consumption calculation unit 21 and stored in the power consumption storage unit 22, is $P_1$. The gradient $\alpha$ of the approximate straight line expressed by equation 1 for calculating the estimation value of total power consumption based on the least squares method can be calculated by using equation 2 below, and the intercept $\beta$ can be calculated by using equation 3 below.

[Equation 2]

$$\alpha = \frac{n\sum_{i=1}^{n} t_i P_i - \sum_{i=1}^{n} t_i \sum_{i=1}^{n} P_i}{n\sum_{i=1}^{n} t_i^2 - \left(\sum_{i=1}^{n} t_i\right)^2} \quad (2)$$

[Equation 3]

$$\beta = \frac{\sum_{i=1}^{n} t_i^2 \sum_{i=1}^{n} P_i - \sum_{i=1}^{n} t_i P_i \sum_{i=1}^{n} t_i}{n\sum_{i=1}^{n} t_i^2 - \left(\sum_{i=1}^{n} t_i\right)^2} \quad (3)$$

For example, when the gradient $\alpha$ and intercept $\beta$ of the approximate straight line expressed in equation 1 are calculated by using first-order approximation (linear approximation), two values of total power consumption at or before the present time point, which are stored in the power consumption storage unit 22, are used. The two values of total power consumption "at or before" the present time point, which are used for calculating the approximate straight line, may or may not include the value of total power consumption at the present time point. In FIG. 6B, for example, it is assumed that a time instant of the present time point is $t_2$. It is assumed that a total power consumption at time instant $t_2$, which is calculated by the power consumption calculation unit 21 and stored in the power consumption storage unit 22 and is obtained as the sum of the output of the servomotor for drive 3, the winding loss in the servomotor for drive 3, the loss in the converter 11 and the loss in the inverter for drive 12, is $P_2$; and a total power consumption at time instant $t_1$ before time instant $t_2$, which is calculated by the power consumption calculation unit 21 and stored in the power consumption storage unit 22, is $P_1$. The gradient $\alpha$ of the approximate straight line expressed by equation 1 for calculating the estimation value of total power consumption based on the linear approximation can be calculated by using equation 4 below, and the intercept $\beta$ can be calculated by using equation 5 below.

[Equation 4]

$$\alpha = \frac{P_n - P_{n-1}}{t_n - t_{n-1}} \quad (4)$$

[Equation 5]

$$\beta = \frac{t_n P_{n-1} - t_{n-1} P_n}{t_n - t_{n-1}} \quad (5)$$

If a time instant later than the present time point by a predetermined time is substituted in the approximate straight line indicated by equation 1, which is calculated as described above, a power consumption estimation value at the time instant later by the predetermined time can be calculated. The power consumption estimation value calculation unit 23 in the power consumption estimation unit 15 calculates the power consumption estimation value in every control cycle, according to the above-described serial process. Aside from the above-described calculation of the power consumption estimation value with use of the total power consumption at the present time point, the power consumption estimation value can be calculated by using the output of the servomotor for drive 3 at the present time point or the speed of the servomotor for drive 3 at the present time point, and this will be described later as second to fourth modes.

Figure 7:
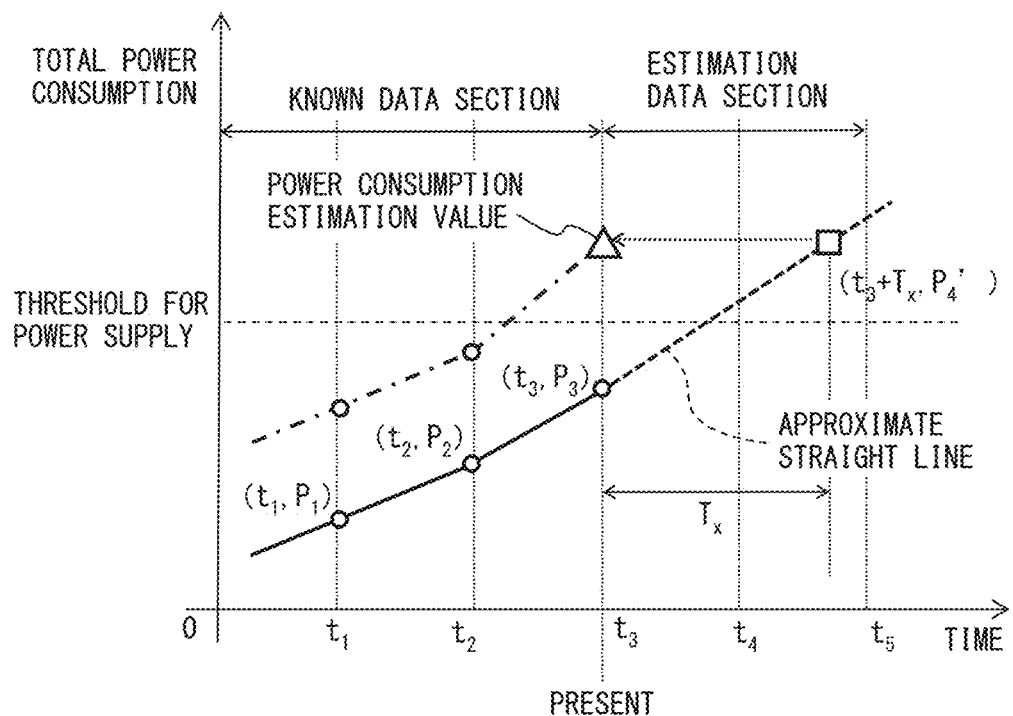
FIG. 7 is a view for explaining calculation of a power consumption estimation value by the power consumption estimation unit, and control of the power storage device by a power storage device control unit.

The power storage device control unit 16 generates a power supply command or a power storage command in accordance with the power consumption estimation value estimated by the power consumption estimation unit 15, and controls power supply or power storage of the power storage device 14. FIG. 7 is a view for explaining calculation of a power consumption estimation value by the power consumption estimation unit, and control of the power storage device by the power storage device control unit. For example, it is assumed that a time instant of the present time point is $t_3$. An approximate straight line expressed by equation 1, which is calculated as described above, is indicated by a broken line. Straight lines, which connect power consumption estimation values estimated by the power consumption estimation unit 15 up to time instant $t_3$ are indicated by dot-and-dash lines. At time instant $t_3$ of the present time point, the power consumption estimation process by the power consumption estimation unit 15 and the command generation process for the power storage device 14 by the power storage device control unit 16 are executed. In other words, the power consumption estimation unit 15 calculates the gradient $\alpha$ and intercept $\beta$ in equation 1, and further calculates a power consumption estimation value $P_4{}'$ by substituting time instant $t_3 + T_x$, which is later than time instant $t_3$ of the present time point by a predetermined time $T_x$, for a variable t in equation 1. Then, the power storage device control unit 16 compares the power consumption estimation value estimated at time instant $t_3$ of the present time point with a threshold for power supply and a threshold for power storage. In the example illustrated in FIG. 7, since the power consumption estimation value exceeds the threshold for power supply, the power storage device control unit 16 outputs a power supply command to the power storage device 14 and controls the power storage device 14, thus causing the power storage device 14 to supply DC power to the direct current link 4.

Figure 8:
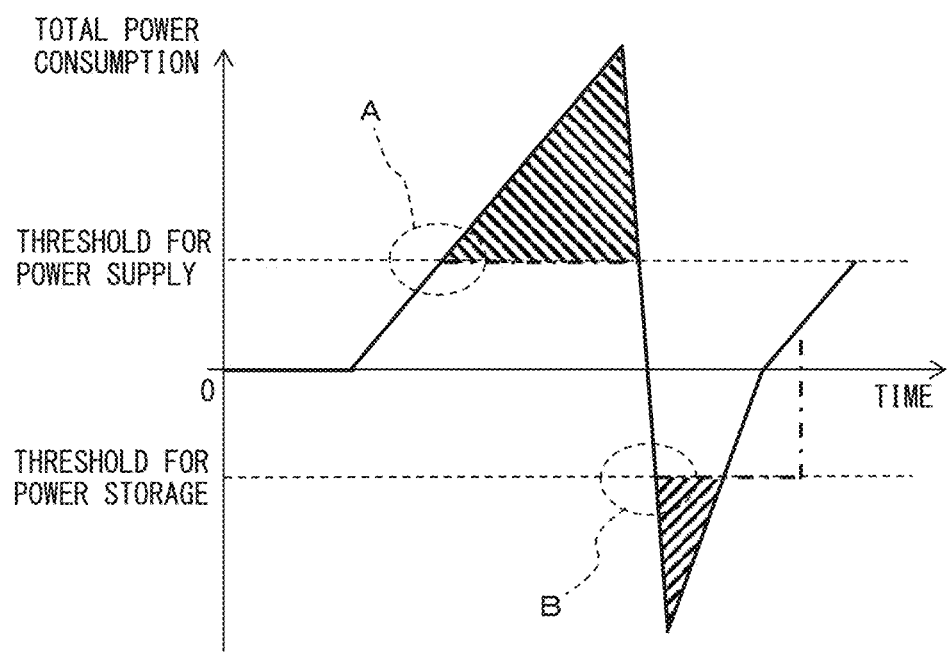
FIG. 8 is a view exemplarily illustrating a relationship between the power consumption estimation value, and a threshold for power supply and a threshold for power storage in the motor drive apparatus in one embodiment of the present disclosure.

FIG. 8 is a view exemplarily illustrating a relationship between the power consumption estimation value, and the threshold for power supply and the threshold for power storage in the motor drive apparatus according to one embodiment of the present disclosure. For example, a description is given of control by the power storage device control unit 16 in a case in which the power consumption estimation value calculated by the power consumption estimation unit 15 changes as illustrated in FIG. 8. When the power storage device control unit 16 determines that the power consumption estimation value exceeds the threshold for power supply, the power storage device control unit 16 outputs a power supply command to the power storage device 14 and controls the power storage device 14, thus causing the power storage device 14 to supply DC power to the direct current link 4. Thereafter, when the power storage device control unit 16 determines that the power consumption estimation value falls below the threshold for power supply, the power storage device control unit 16 stops the generation of the power supply command to the power storage device 14 and causes the power storage device 14 to finish the power supply operation of DC power to the direct current link 4. Further, when the power storage device control unit 16 determines that the power consumption estimation value falls below the threshold for power storage, the power storage device control unit 16 outputs a power storage command to the power storage device 14 and controls the power storage device 14, thus causing the power storage device 14 to store DC power from the direct current link 4. Thereafter, when the power storage device control unit 16 determines that the power consumption estimation value exceeds the threshold for power storage, the power storage device control unit 16 stops the generation of the power storage command to the power storage device 14 and causes the power storage device 14 to finish the power storage operation of DC power from the direct current link 4. Referring to FIG. 9A to FIG. 9C and FIG. 10A to FIG. 10C, a more detailed description is given of operation examples of the power consumption estimation unit 15 and power storage device control unit 16 in a time range A in FIG. 8 before and after a time when the power consumption estimation value exceeds the threshold for power supply, and in a time range B in FIG. 8 before and after a time when the power consumption estimation value falls below the threshold for power storage.

Figure 9A:
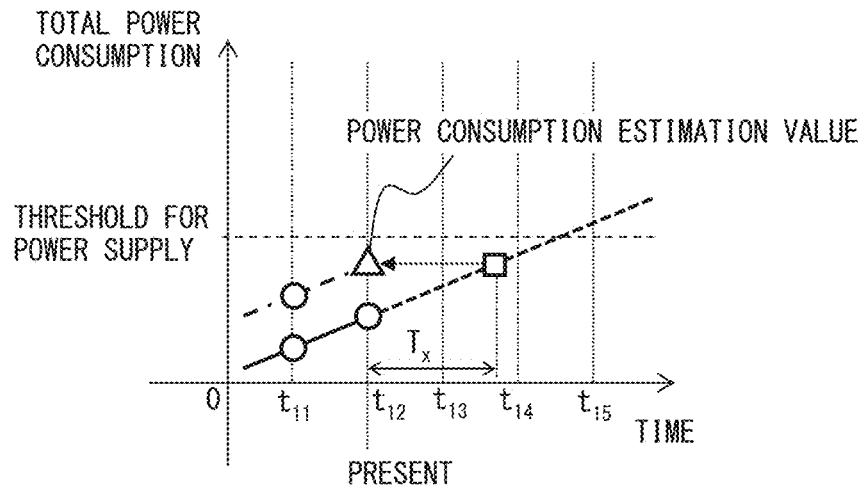
FIG. 9A to FIG. 9C are views illustrating operation examples of the power consumption estimation unit and power storage device control unit at times before and after the power consumption estimation value exceeds the threshold for power supply in the motor drive apparatus according to one embodiment of the present disclosure.
Figure 9B:
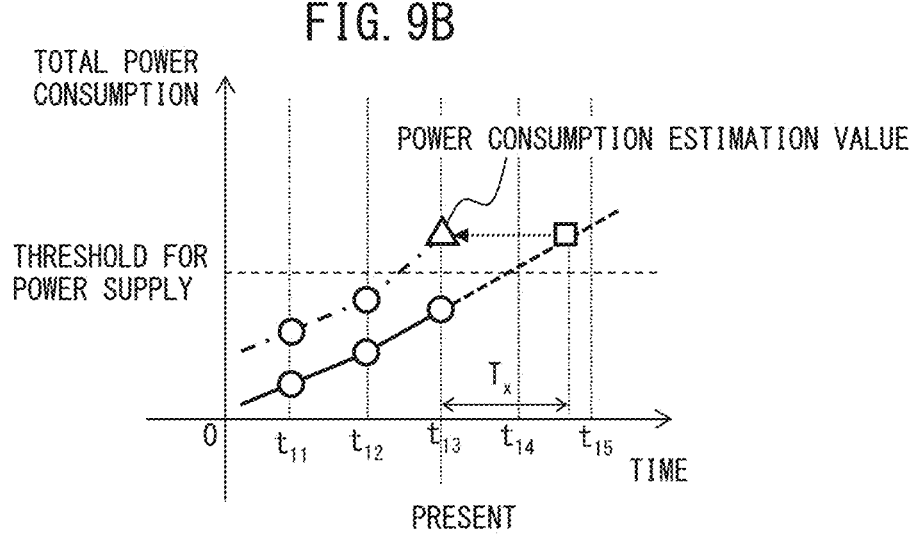
Figure 9C:
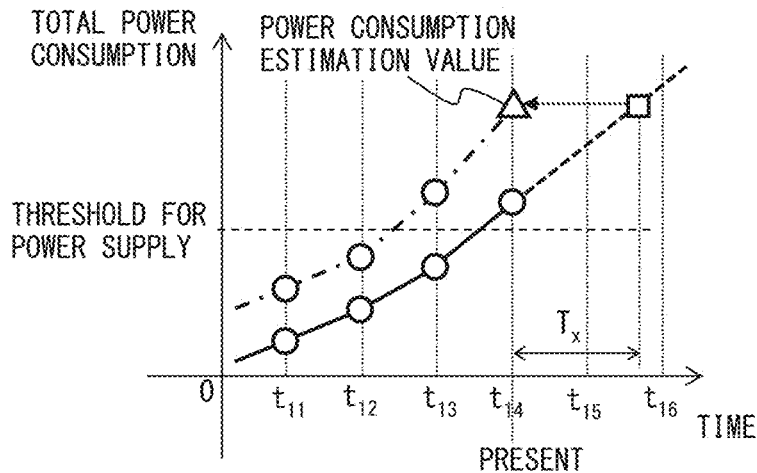

FIG. 9A to FIG. 9C are views illustrating operation examples of the power consumption estimation unit and power storage device control unit at times before and after the power consumption estimation value exceeds the threshold for power supply in the motor drive apparatus according to one embodiment of the present disclosure.

As illustrated in FIG. 9A, when the present time instant is $t_{12}$, the gradient $\alpha$ and intercept $\beta$ in equation 1 are calculated based on the total power consumption which is calculated by the power consumption calculation unit 21 before time instant $t_{12}$ and is stored in the power consumption storage unit 22, and a power consumption estimation value is calculated by substituting time instant $t_{12}+T_x$, which is later than time instant $t_{12}$ of the present time point by a predetermined time $T_x$, for the variable t in equation 1. Then, the power storage device control unit 16 compares the power consumption estimation value and the threshold for power supply. As illustrated in FIG. 9A, since the power consumption estimation value does not exceed the threshold for power supply at time instant $t_{12}$, the power storage device control unit 16 neither generates the power supply command, nor executes power supply control for the power storage device 14.

When time further advances and the present time instant has become $t_{13}$, as illustrated in FIG. 9B, the gradient $\alpha$ and intercept $\beta$ in equation 1 are calculated based on the total power consumption which is calculated by the power consumption calculation unit 21 before time instant $t_{13}$ and is stored in the power consumption storage unit 22, and a power consumption estimation value is calculated by substituting time instant $t_{13}+T_x$, which is later than time instant $t_{13}$ of the present time point by the predetermined time $T_x$, for the variable t in equation 1. Then, the power storage device control unit 16 compares the power consumption estimation value and the threshold for power supply. As illustrated in FIG. 9B, since the power consumption estimation value exceeds the threshold for power supply at time instant $t_{13}$, the power storage device control unit 16 outputs the power supply command to the power storage device 14.

When time further advances and the present time instant has become $t_{14}$, as illustrated in FIG. 9C, the gradient $\alpha$ and intercept $\beta$ in equation 1 are calculated based on the total power consumption which is calculated by the power consumption calculation unit 21 before time instant $t_{14}$ and is stored in the power consumption storage unit 22, and a power consumption estimation value is calculated by substituting time instant $t_{14}+T_x$, which is later than time instant $t_{14}$ of the present time point by the predetermined time $T_x$, for the variable t in equation 1. Then, the power storage device control unit 16 compares the power consumption estimation value and the threshold for power supply. As illustrated in FIG. 9C, since the power consumption estimation value still exceeds the threshold for power supply at time instant $t_{14}$, the power storage device control unit 16 outputs the power supply command to the power storage device 14.

Figure 10A:
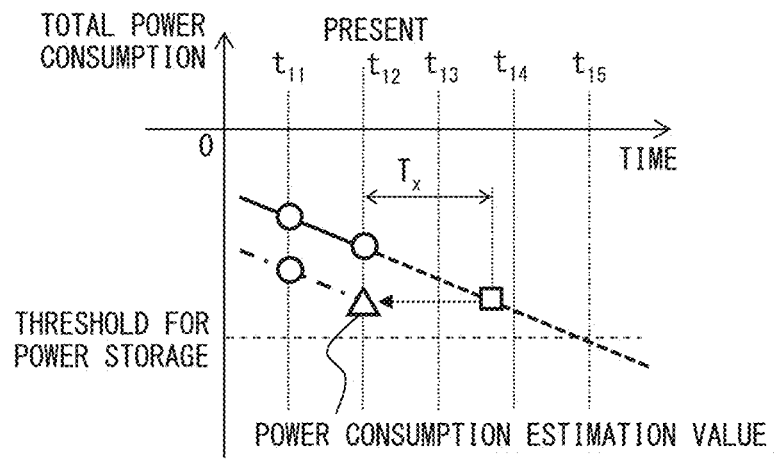
FIG. 10A to FIG. 10C are views illustrating operation examples of the power consumption estimation unit and power storage device control unit at times before and after the power consumption estimation value falls below the threshold for power storage in the motor drive apparatus according to one embodiment of the present disclosure.
Figure 10B:
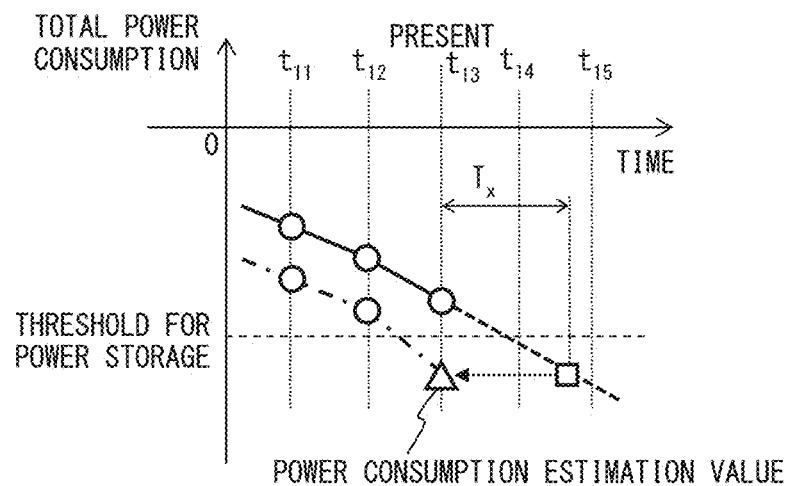
Figure 10C:
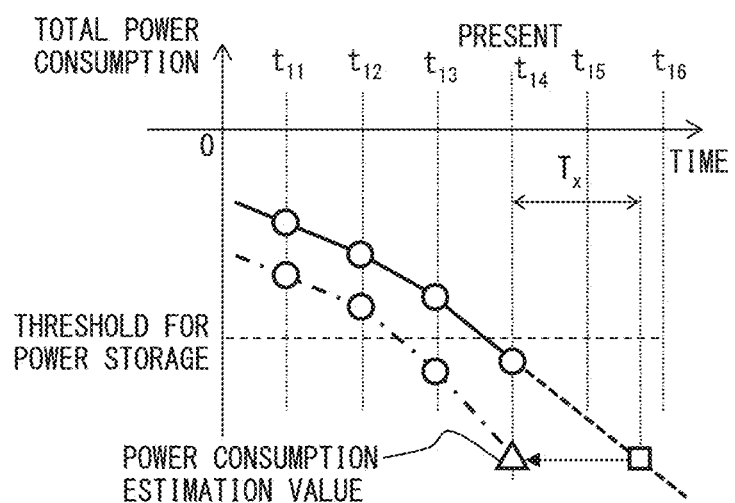

FIG. 10A to FIG. 10C are views illustrating operation examples of the power consumption estimation unit and power storage device control unit at times before and after the power consumption estimation value falls below the threshold for power storage in the motor drive apparatus according to one embodiment of the present disclosure.

As illustrated in FIG. 10A, when the present time instant is $t_{12}$, the gradient $\alpha$ and intercept $\beta$ in equation 1 are calculated based on the total power consumption which is calculated by the power consumption calculation unit 21 before time instant $t_{12}$ and is stored in the power consumption storage unit 22, and a power consumption estimation value is calculated by substituting time instant $t_{12}+T_x$, which is later than time instant $t_{12}$ of the present time point by a predetermined time $T_x$, for the variable t in equation 1. Then, the power storage device control unit 16 compares the power consumption estimation value and the threshold for power storage. As illustrated in FIG. 10A, since the power consumption estimation value does not fall below the threshold for power storage at time instant $t_{12}$, the power storage device control unit 16 neither generates the power storage command, nor executes power storage control for the power storage device 14.

When time further advances and the present time instant has become $t_{13}$, as illustrated in FIG. 10B, the gradient α and intercept β in equation 1 are calculated based on the total power consumption which is calculated by the power consumption calculation unit 21 before time instant $t_{13}$ and is stored in the power consumption storage unit 22, and a power consumption estimation value is calculated by substituting time instant $t_{13}+T_x$, which is later than time instant $t_{13}$ of the present time point by the predetermined time $T_x$, for the variable t in equation 1. Then, the power storage device control unit 16 compares the power consumption estimation value and the threshold for power storage. As illustrated in FIG. 10B, since the power consumption estimation value falls below the threshold for power storage at time instant $t_{13}$, the power storage device control unit 16 outputs the power storage command to the power storage device 14.

When time further advances and the present time instant has become $t_{14}$, as illustrated in FIG. 10C, the gradient α and intercept β in equation 1 are calculated based on the total power consumption which is calculated by the power consumption calculation unit 21 before time instant $t_{14}$ and is stored in the power consumption storage unit 22, and a power consumption estimation value is calculated by substituting time instant $t_{14}+T_x$, which is later than time instant $t_{14}$ of the present time point by the predetermined time $T_x$, for the variable t in equation 1. Then, the power storage device control unit 16 compares the power consumption estimation value and the threshold for power storage. As illustrated in FIG. 10C, since the power consumption estimation value still falls below the threshold for power storage at time instant $t_{14}$, the power storage device control unit 16 outputs the power storage command to the power storage device 14.

Figure 11:
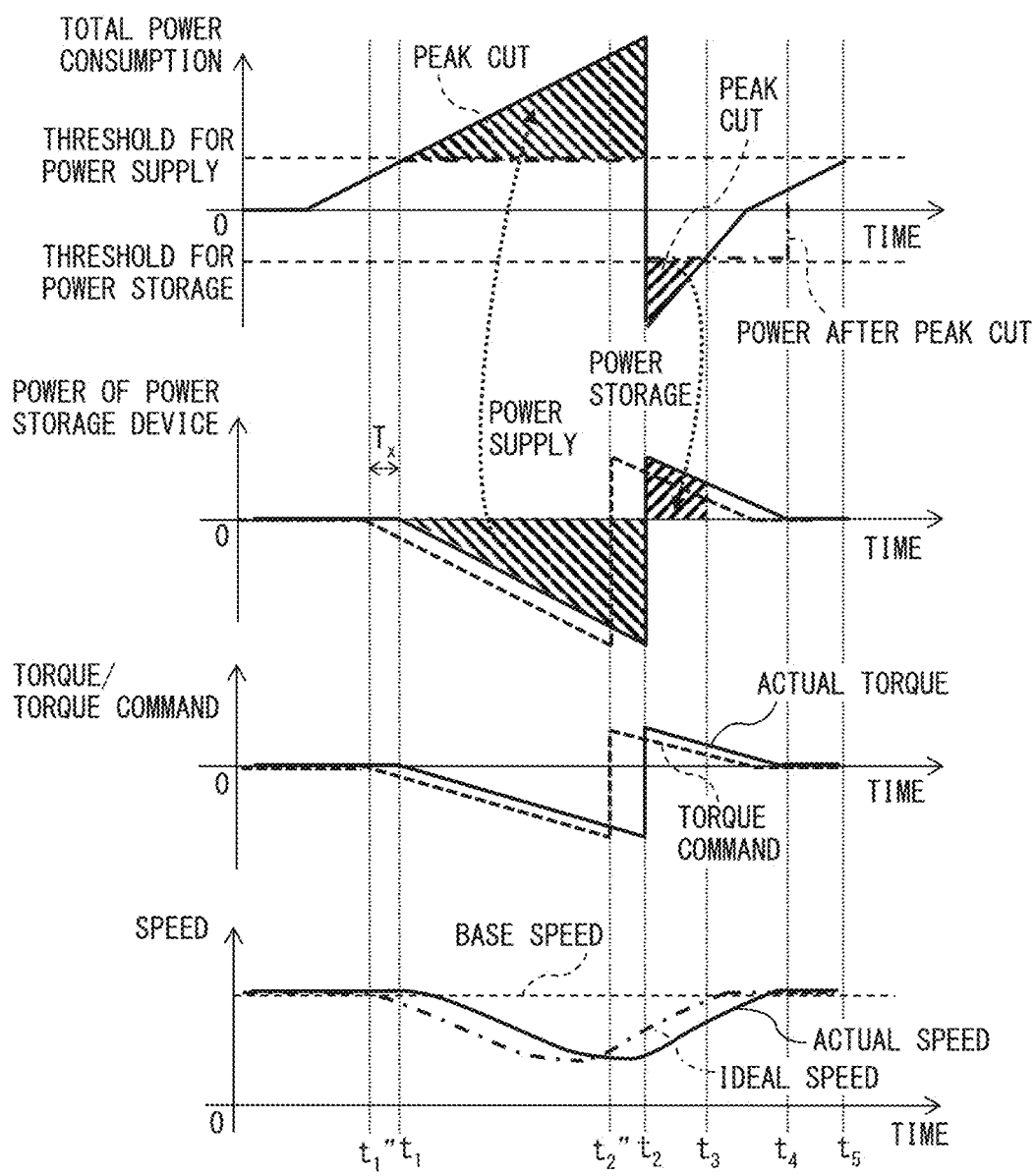
FIG. 11 is a view exemplarily illustrating a relationship between a total power consumption and an operation of a flywheel power storage device in the motor drive apparatus according to one embodiment of the present disclosure.

FIG. 11 is a view exemplarily illustrating a relationship between a total power consumption and an operation of a flywheel power storage device in the motor drive apparatus according to one embodiment of the present disclosure. An uppermost part of FIG. 11 illustrates a total power consumption which is calculated as a sum of an output of the servomotor for drive 3, a winding loss in the servomotor for drive 3, a loss in the converter 11 and a loss in the inverter for drive 12; a second part from above in FIG. 11 illustrates power of the flywheel power storage device 14; a third part from above in FIG. 11 illustrates a torque command to the servomotor for buffer 42, and an actual torque of the servomotor for buffer 42; and a lowermost part of FIG. 11 illustrates a speed of the servomotor for buffer 42.

Consideration is now given to an example in which the total power consumption varies by accelerating the servomotor for drive 3 by the motor drive apparatus 1 including the flywheel power storage device 14 is accelerated, and then decelerating the servomotor for drive 3 at time instant $t_2$.

As described above, in the present embodiment, by taking into account the response delay time from when the power storage device control unit 16 outputs a power supply command or a power storage command to the power storage device 14 to when the power storage device 14 actually starts power supply or power storage, a total power consumption at a time point later than the present time point by "time $T_x$ corresponding to the response delay time" is estimated from known data relating to a total power consumption before the present time point, and the power storage device control unit 16 controls the power supply and power storage of the power storage device 14, based on a comparison result between the estimation value of the total power consumption and a threshold for power supply and a threshold for power storage. In FIG. 11, when the servomotor for drive 3 gradually accelerated and the total power consumption exceeds the threshold for power supply at, e.g., time instant $t_1$, the power consumption estimation unit 15 estimates the total power consumption at time instant $t_1$, at the time point of time instant $t_1''$ which is earlier than time instant $t_1$ by a predetermined time $T_x$, and outputs the estimated total power consumption as "power consumption estimation value". At time instant $t_1''$, the power storage device control unit 16 compares the power consumption estimation value and the threshold for power supply, and, since the power consumption estimation value exceeds the threshold for power supply, the power storage device control unit 16 outputs a power supply command to the power storage device 14. Based on the power supply command, a torque command to the servomotor for buffer 42 is generated. Since the power storage device 14 actually starts the power supply with a delay of the predetermined time $T_x$ from when the power storage device control unit 16 outputs the power supply command to the power storage device 14, the actual torque of the servomotor for buffer 42 follows the torque command with a delay of the predetermined time $T_x$. In other words, the power storage device 14 starts the supply of DC power to the direct current link 4 at time instant $t_1$ which is later, by the predetermined time $T_x$, than time instant $t_1''$ at which the power storage device control unit 16 outputs the power supply command. Thereby, from time instant $t_1$ onward, that part of the total power consumption, which exceeds the threshold for power supply, is supplemented by the DC power supplied from the power storage device 14 to the direct current link 4, and a power peak of the AC power source 2 is cut.

When the servomotor for drive 3 is decelerated and the total power consumption falls below the threshold for power storage at time instant $t_2$, the power consumption estimation unit 15 estimates the total power consumption at time instant $t_2$, at the time point of time instant $t_2''$ which is earlier than time instant $t_2$ by the predetermined time $T_x$, and outputs the estimated total power consumption as "power consumption estimation value". At time instant $t_2''$, the power storage device control unit 16 compares the power consumption estimation value and the threshold for power storage, and, since the power consumption estimation value falls below the threshold for power storage, the power storage device control unit 16 outputs a power storage command to the power storage device 14. Based on the power storage command, a torque command to the servomotor for buffer 42 is generated. Since the power storage device 14 actually starts the power storage with a delay of the predetermined time $T_x$ from when the power storage device control unit 16 outputs the power storage command to the power storage device 14, the actual torque of the servomotor for buffer 42 follows the torque command with a delay of the predetermined time $T_x$. In other words, the power storage device 14 starts the storage of DC power from the direct current link 4 at time instant which is later, by the predetermined time $T_x$, than time instant $t_2''$ at which the power storage device control unit 16 outputs the power storage command. Thereby, from time instant $t_2$ onward, power corresponding to a difference between the total consumption power (indicative of a negative value since the total power consumption is regenerative power of the servomotor for drive 3) and the threshold for power storage is stored from the direct current link 4 into the power storage device 14, and a power peak of the AC power source 2 is cut.

Figure 12:
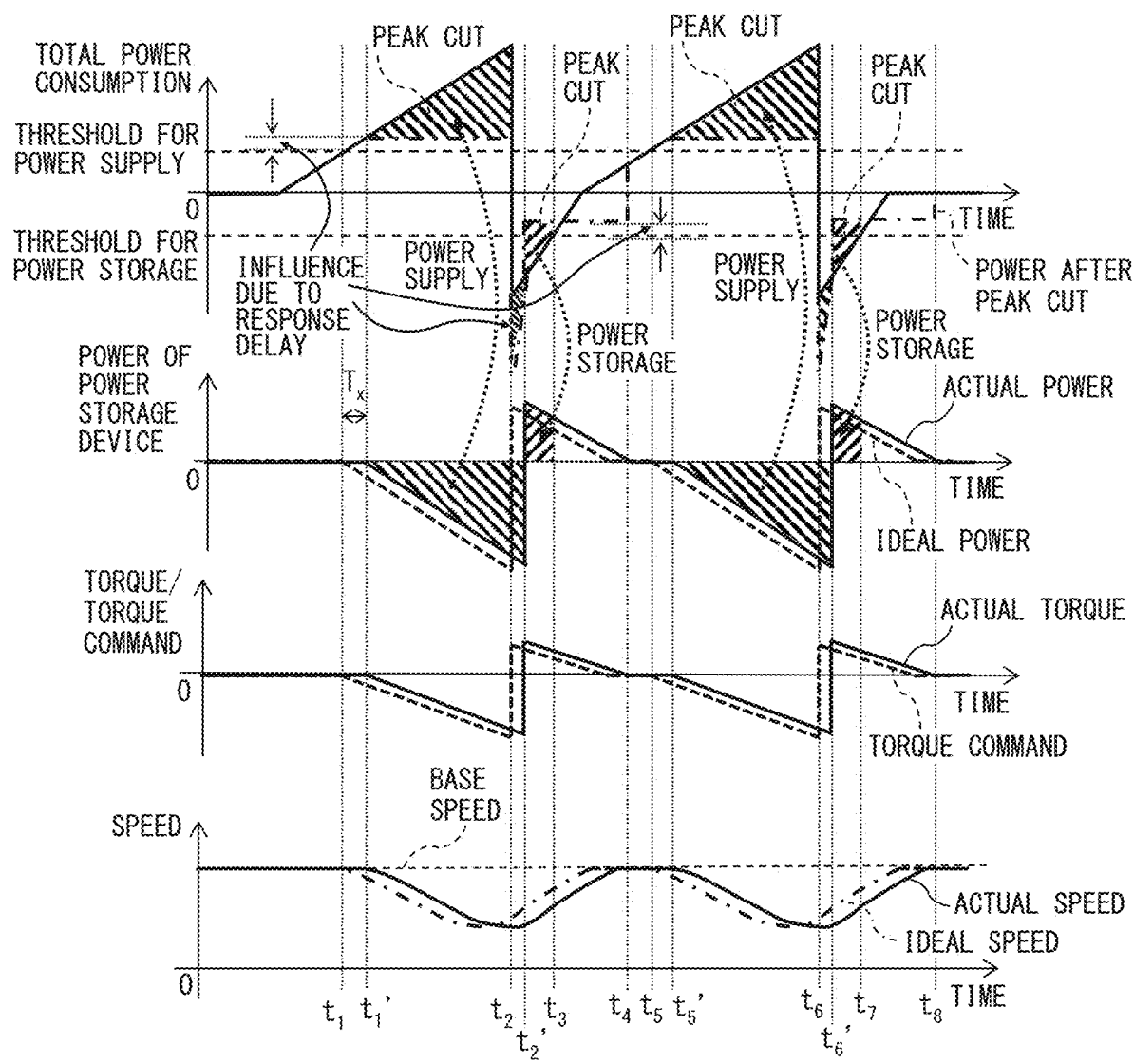
FIG. 12 is a view exemplarily illustrating a relationship between a total power consumption and an operation of a flywheel power storage device in a conventional motor drive apparatus in which a response delay of a power storage device is not taken into account.

FIG. 12 is a view exemplarily illustrating a relationship between a total power consumption and an operation of a flywheel power storage device in a conventional motor drive apparatus in which a response delay of a power storage device is not taken into account. An uppermost part of FIG. 12 illustrates a total power consumption which is calculated as a sum of an output of the servomotor for drive, a winding loss in the servomotor for drive, a loss in the converter and a loss in the inverter for drive; a second part from above in FIG. 12 illustrates power of the flywheel power storage device; a third part from above in FIG. 12 illustrates a torque command to the servomotor for buffer, and an actual torque of the servomotor for buffer; and a lowermost part of FIG. 12 illustrates a speed of the servomotor for buffer.

In FIG. 12, consideration is given to an example in which the total power consumption varies by accelerating the servomotor for drive 3 by the conventional motor drive apparatus and then decelerating the servomotor for drive 3 at time instant $t_2$, in the same operation pattern as in the case of FIG. 11, without taking into account the response delay of the power storage device.

In FIG. 12, when the servomotor for drive is gradually accelerated and the total power consumption exceeds the threshold for power supply at, e.g., time instant $t_1$, the power storage device control unit outputs a power supply command to the power storage device at the time point of time instant $t_1$. Based on the power supply command, a torque command to the servomotor for buffer is generated. Since the power storage device actually starts the power supply with a response delay time $T_x$ from when the power storage device receives the power supply command, the actual torque of the servomotor for buffer follows the torque command with a delay of the predetermined time $T_x$. In other words, the power storage device starts the supply of DC power to the direct current link at time instant $t_1'$ which is later, by the predetermined time $T_x$, than time instant $t_1$ at which the power storage device control unit outputs the power supply command. Thereby, from time instant $t_1'$ onward, that part of the total power consumption, which exceeds the threshold for power supply, is supplemented by the DC power supplied from the power storage device to the direct current link, and a power peak of the AC power source is cut. However, since the power supply start is delayed due to the response delay of the power storage device, despite the total power consumption exceeding the threshold for power supply at time instant $t_1$, that part of the total power consumption, which exceeds the threshold for power supply, fails to be cut in a time range between time instant $t_1$ and time instant $t_1'$.

In FIG. 12, when the servomotor for drive is decelerated and the total power consumption falls below the threshold for power storage at time instant $t_2$, the power storage device control unit outputs a power storage command to the power storage device. Based on the power storage command, a torque command to the servomotor for buffer is generated. Since the power storage device actually starts the power storage with a response delay time $T_x$ from when the power storage device receives the power storage command, the actual torque of the servomotor for buffer follows the torque command with a delay of the predetermined time $T_x$. In other words, the power storage device starts the storage of DC power from the direct current link at time instant $t_2'$ which is later, by the predetermined time $T_x$, than time instant $t_2$ at which the power storage device control unit outputs the power supply command. Thereby, from time instant $t_2'$ onward, power corresponding to a difference between the total consumption power (indicative of a negative value since the total power consumption is regenerative power of the servomotor for drive) and the threshold for power storage is stored from the direct current link into the power storage device, and a power peak of power source equipment is cut. However, since the power storage start is delayed due to the response delay of the power storage device, despite the total power consumption falling below the threshold for power storage at time instant $t_2$, a total power consumption corresponding to the difference between the total power consumption and the threshold for storage fails to be cut in a time range between time instant $t_2$ and time instant $t_3$ at which the total power consumption exceeds the threshold for power storage. Since an operation at time instant $t_5$ onward is the same as the operation up to time instant $t_4$, a description thereof is omitted.

As described with reference to FIG. 12, conventionally, it may not be possible to reduce the power peak because of the response delay in the time range from when the power supply command or power storage command is output to the power storage device to when the power storage device actually starts the power supply operation or power storage operation.

By contrast, according to the embodiment of the present disclosure, by taking into account the response delay time from when the power storage device control unit 16 outputs a power supply command or a power storage command to the power storage device 14 to when the power storage device 14 actually starts power supply or power storage, a total power consumption at a time point later than the present time point by the "time corresponding to the response delay time" is estimated from known data relating to a total power consumption before the present time point, and the power storage device control unit 16 controls the power supply and power storage of the power storage device 14, based on a comparison result between the estimation value of the total power consumption and the threshold for power supply and the threshold for power storage, and therefore the power peak can surely be reduced.

Figure 13:
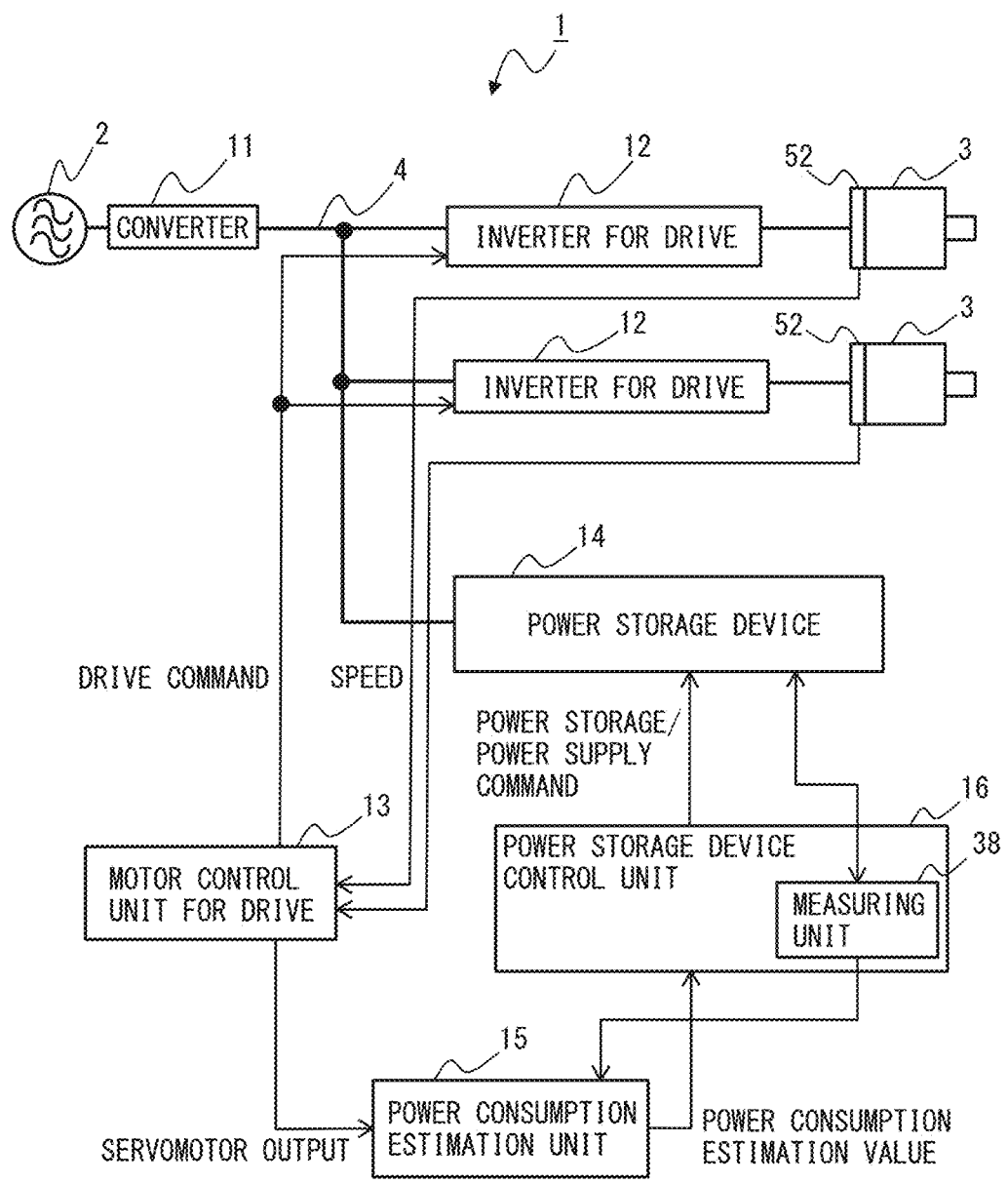
FIG. 13 is a block diagram illustrating the motor drive apparatus according to one embodiment of the present disclosure, which includes a measuring unit which measures a response delay time of the power storage device.

As described above, the "response delay time from when the power storage device control unit 16 outputs a power supply command or a power storage command to the power storage device 14 to when the power storage device 14 actually starts power supply or power storage" is set as the above-described "predetermined time" which is used when the power consumption estimation unit 15 calculates the power consumption estimation value. The response delay time from when the power storage device control unit 16 outputs a power supply command or a power storage command to the power storage device 14 to when the power storage device 14 actually starts power supply or power storage may be measured in advance or may be measured in real time by providing a measuring unit. FIG. 13 is a block diagram illustrating the motor drive apparatus according to one embodiment of the present disclosure, which includes a measuring unit which measures a response delay time of the power storage device. The power storage device control unit 16 includes a measuring unit 38 which measures the response delay time from when the power storage device control unit 16 outputs a power supply command or a power storage command to the power storage device 14 to when the power storage device 14 actually starts power supply or power storage. The power consumption estimation unit 15 estimates a total power consumption at a time point later than the present time point by at least the "time corresponding to the response delay time" measured by the measuring unit 38, and outputs the estimation value of the total power consumption as the power consumption estimation value.

Next, power consumption estimation units 15 according to second to fourth modes will be described. Each of the power consumption estimation units 15 according to the second to fourth modes calculates a servomotor-for-drive output estimation value which is an estimation value later, by a predetermined time, than an output value at the present time point of the servomotors for drive 3, and calculates a power consumption estimation value including the servomotor-for-drive output estimation value.

Figure 14:
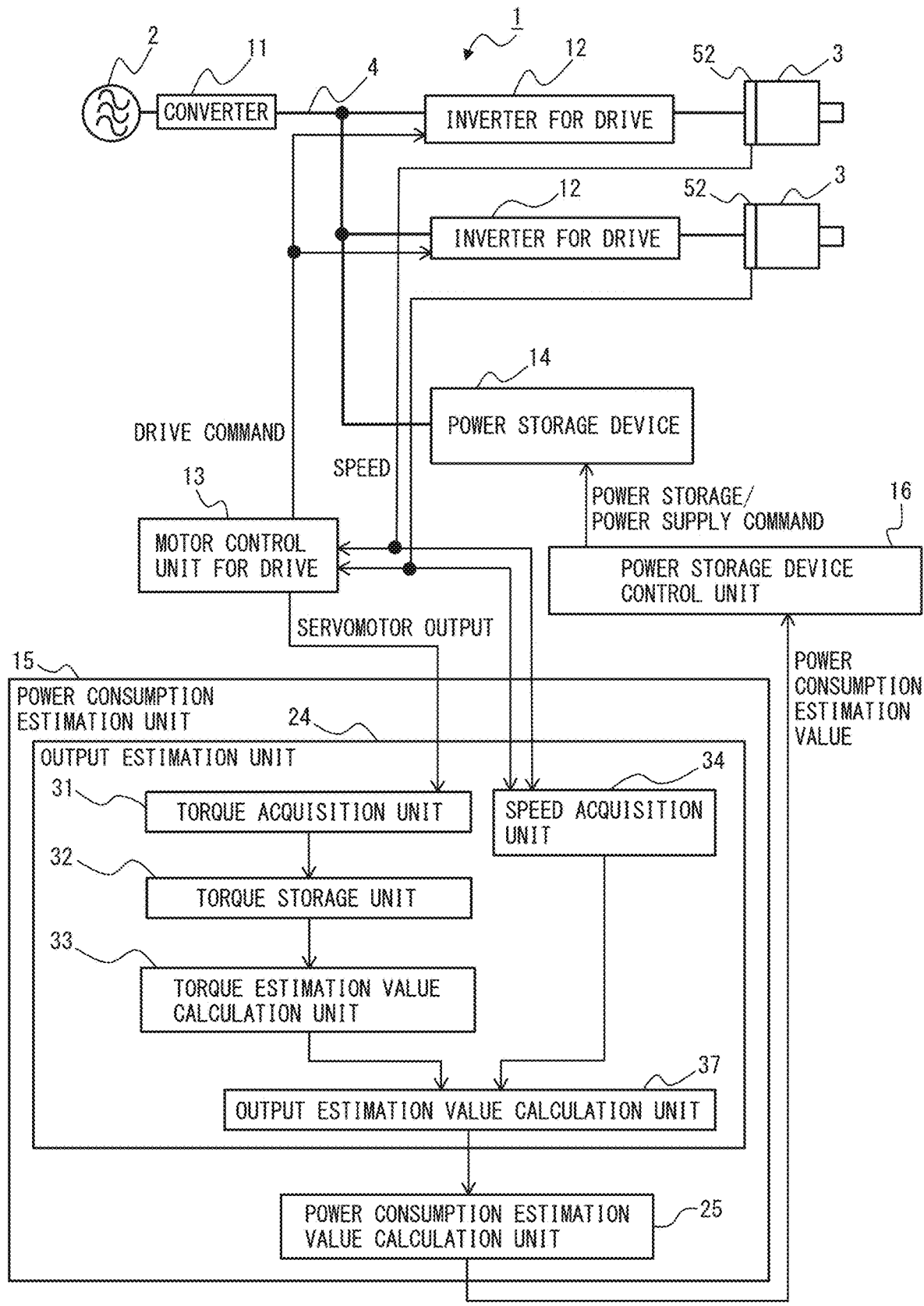
FIG. 14 is a block diagram illustrating the motor drive apparatus according to one embodiment of the present disclosure, which includes a power consumption estimation unit according to a second mode.

FIG. 14 is a block diagram illustrating the motor drive apparatus according to one embodiment of the present disclosure, which includes a power consumption estimation unit according to the second mode.

The power consumption estimation unit 15 according to the second mode includes an output estimation unit 24 which acquires a servomotor-for-drive output estimation value that is an estimation value at a time point later, by a predetermined time, than an output value at the present time point of the servomotors for drive 3; and a power consumption estimation value calculation unit 25 which calculates a power consumption estimation value including at least the servomotor-for-drive output estimation value.

In the second mode, the output estimation unit 24 includes a torque acquisition unit 31, a torque storage unit 32, a torque estimation value calculation unit 33, a speed acquisition unit 34, and an output estimation value calculation unit 37.

The torque acquisition unit 31 acquires a value of torque of the servomotors for drive 3 from the motor control unit for drive 13.

The torque storage unit 32 stores the value of torque acquired by the torque acquisition unit 31. The torque storage unit 32 is composed of, for example, an electrically erasable programmable nonvolatile memory such as an EEPROM (trademark), or a random access memory which is capable of high-speed read/write, such as a DRAM or an SRAM.

The speed acquisition unit 34 acquires a value of speed of the servomotors for drive 3 from the speed detectors 52.

The torque estimation value calculation unit 33 calculates a torque estimation value which is an estimation value later than a value of torque at the present time point by a predetermined time, based on at least two values of torque at or before the present time point, the at least two values of torque being stored in the torque storage unit 32. As regards the torque estimation value, for example, an approximate straight line is calculated by using at least two values of torque at or before the present time point, the at least two values of torque being stored in the torque storage unit 32, and a torque at a time instant later than the present time point by the predetermined time is estimated.

Figure 15:
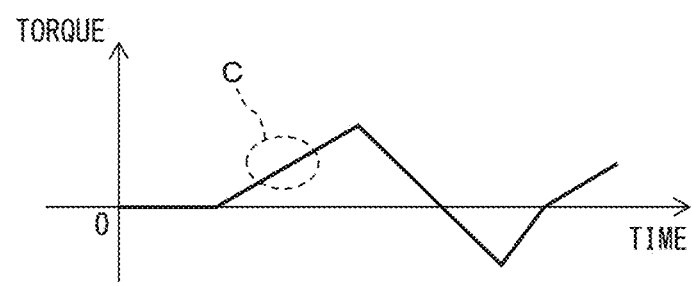
FIG. 15 is a view exemplarily illustrating a variation of torque of a servomotor for drive.
Figure 16A:
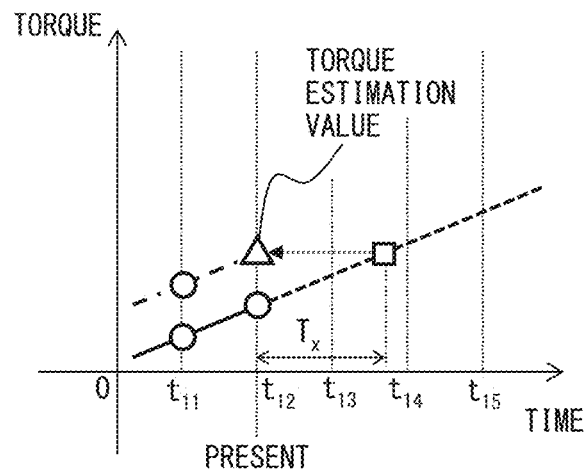
FIG. 16A to FIG. 16C are views for explaining the calculation of a torque estimation value of the servomotor for drive in the neighborhood of a region C in FIG. 15.
Figure 16B:
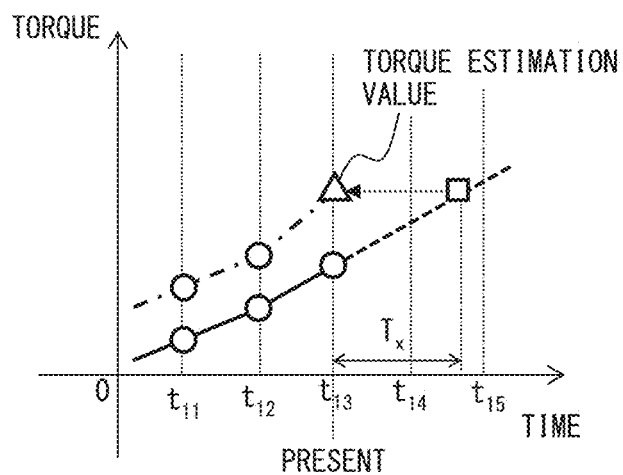
Figure 16C:
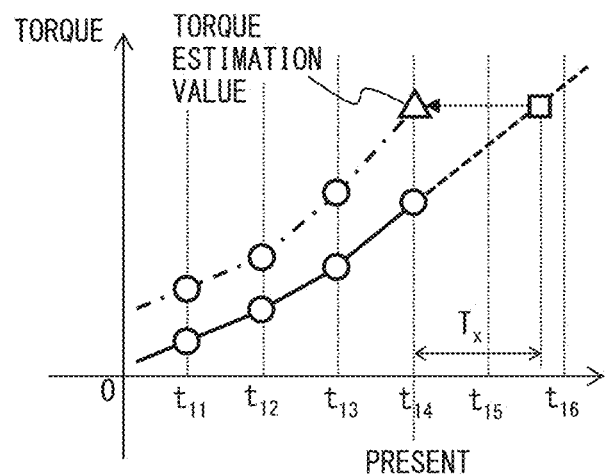

FIG. 15 is a view exemplarily illustrating a variation of torque of a servomotor for drive. FIG. 16A to FIG. 16C are views for explaining the calculation of a torque estimation value of the servomotor for drive in the neighborhood of a region C in FIG. 15.

The torque estimation value can be calculated by using an approximate straight line expressed by equation 1 for calculating an estimation value, which was described with reference to FIG. 6A and FIG. 6B. For example, when the least squares method is used for calculating the torque estimation value, as described with reference to FIG. 6A, the gradient $\alpha$ of the approximate straight line expressed by equation 1 for calculating the torque estimation value based on the least squares method can be calculated by using equation 2, and the intercept $\beta$ can be calculated by using equation 3, on the basis of three values of torque at or before the present time point, which are stored in the torque storage unit 32. For example, when the linear approximation is used for calculating the torque estimation value, as described with reference to FIG. 6B, the gradient $\alpha$ of the approximate straight line expressed by equation 1 for calculating the torque estimation value based on the linear approximation can be calculated by using equation 4, and the intercept $\beta$ can be calculated by using equation 5, on the basis of two values of torque at or before the present time point, which are stored in the torque storage unit 32. If a time instant later than the present time point by a predetermined time is substituted in the approximate straight line indicated by equation 1, which is calculated as described above, a torque estimation value at the time instant later by the predetermined time can be calculated. The torque estimation value calculation unit 33 in the output estimation unit 24 calculates the torque estimation value in every control cycle, according to the above-described serial process.

For example, as illustrated in FIG. 16A, when the present time instant is $t_{12}$, the gradient $\alpha$ and intercept $\beta$ in equation 1 are calculated based on the value of torque which is acquired by the torque acquisition unit 31 before time instant $t_{12}$ and is stored in the torque storage unit 32, and a torque estimation value is calculated by substituting time instant $t_{12}+T_x$, which is later than time instant $t_{12}$ of the present time point by a predetermined time $T_x$, for the variable t in equation 1. When time further advances and the present time instant has become $t_{13}$, as illustrated in FIG. 16B, the gradient $\alpha$ and intercept $\beta$ in equation 1 are calculated based on the value of torque which is acquired by the torque acquisition unit 31 before time instant $t_{13}$ and is stored in the torque storage unit 32, and a torque estimation value is calculated by substituting time instant $t_{13}+T_x$, which is later than time instant $t_{13}$ of the present time point by the predetermined time $T_x$, for the variable t in equation 1. When time further advances and the present time instant has become $t_{14}$, as illustrated in FIG. 16C, the gradient $\alpha$ and intercept $\beta$ in equation 1 are calculated based on the value of torque which is acquired by the torque acquisition unit 31 before time instant $t_{14}$ and is stored in the torque storage unit 32, and a torque estimation value is calculated by substituting time instant $t_{14}+T_x$, which is later than time instant $t_{14}$ of the present time point by the predetermined time $T_x$, for the variable t in equation 1.

The output estimation value calculation unit 37 calculates a servomotor-for-drive output estimation value by multiplication between the torque estimation value, which is calculated by the torque estimation value calculation unit 33 as described above, and the value of speed at the present time, which is acquired by the speed acquisition unit 34.

The power consumption estimation value calculation unit 25 calculates a power consumption estimation value including at least the servomotor-for-drive output estimation value calculated by the output estimation value calculation unit 37. In other words, the power consumption estimation value calculation unit 25 calculates the power consumption estimation value by adding the servomotor-for-drive output estimation value calculated by the output estimation value calculation unit 37, the winding loss in the servomotor for drive 3, the loss in the converter 11, and the loss in the inverters for drive 12.

Figure 17:
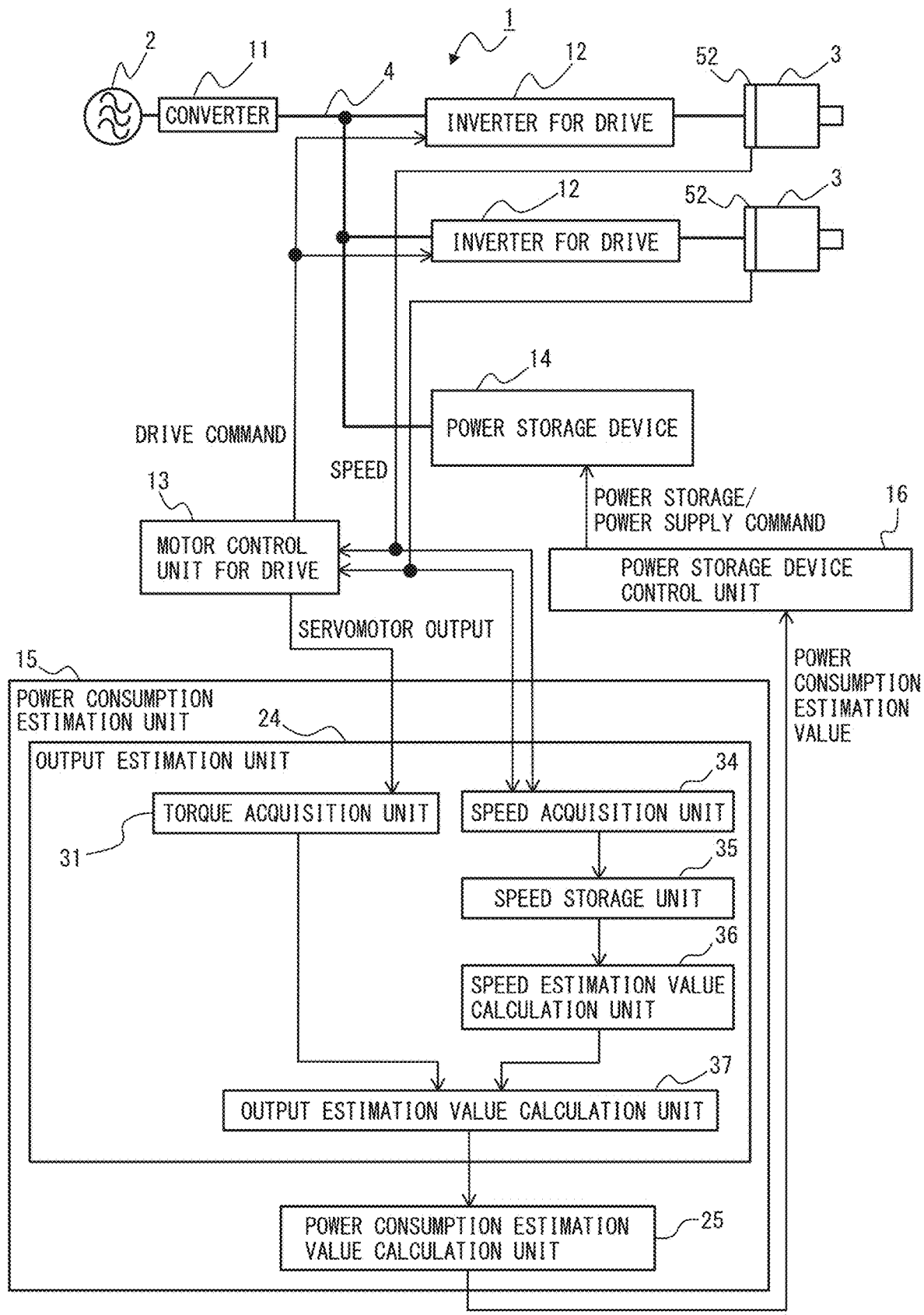
FIG. 17 is a block diagram illustrating the motor drive apparatus according to one embodiment of the present disclosure, which includes a power consumption estimation unit according to a third mode.

FIG. 17 is a block diagram illustrating the motor drive apparatus according to one embodiment of the present disclosure, which includes a power consumption estimation unit according to the third mode.

The power consumption estimation unit 15 according to the third mode includes an output estimation unit 24 which acquires a servomotor-for-drive output estimation value that is an estimation value at a time point later, by a predetermined time, than an output value at the present time point of the servomotors for drive 3; and a power consumption estimation value calculation unit 25 which calculates a power consumption estimation value including at least the servomotor-for-drive output estimation value.

In the third mode, the output estimation unit 24 includes a torque acquisition unit 31, a speed acquisition unit 34, a speed storage unit 35, a speed estimation value calculation unit 36, and an output estimation value calculation unit 37.

The torque acquisition unit 31 acquires a value of torque of the servomotors for drive 3 from the motor control unit for drive 13.

The speed acquisition unit 34 acquires a value of speed of the servomotors for drive 3 from the speed detectors 52.

The speed storage unit 35 stores the value of speed of the servomotors for drive 3 acquired by the speed acquisition unit 34. The speed storage unit 35 is composed of, for example, an electrically erasable programmable nonvolatile memory such as an EEPROM (trademark), or a random access memory which is capable of high-speed read/write, such as a DRAM or an SRAM.

The speed estimation value calculation unit 36 calculates a speed estimation value which is an estimation value later than a value of speed at the present time point by a predetermined time, based on at least two values of speed at or before the present time point, the at least two values of speed being stored in the speed storage unit 35. As regards the speed estimation value, for example, an approximate straight line is calculated by using at least two values of speed at or before the present time point, the at least two values of speed being stored in the speed storage unit 35, and a speed at a time instant later than the present time point by a predetermined time is estimated.

Figure 18:
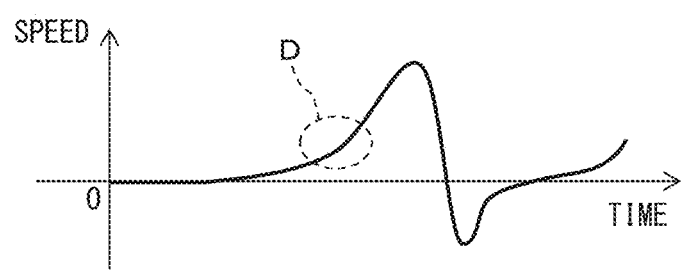
FIG. 18 is a view exemplarily illustrating a variation of speed of the servomotor for drive.
Figure 19A:
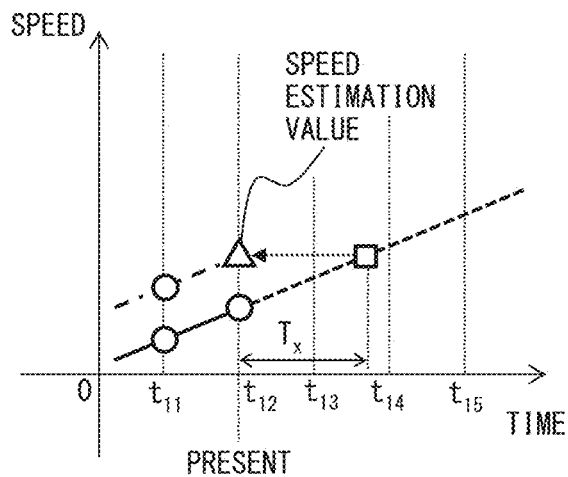
FIG. 19A to FIG. 19C are views for explaining the calculation of a speed estimation value of the servomotor for drive in the neighborhood of a region D in FIG. 18.
Figure 19B:
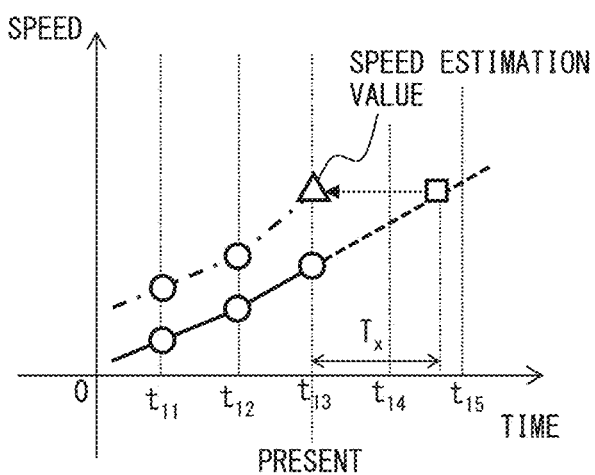
Figure 19C:
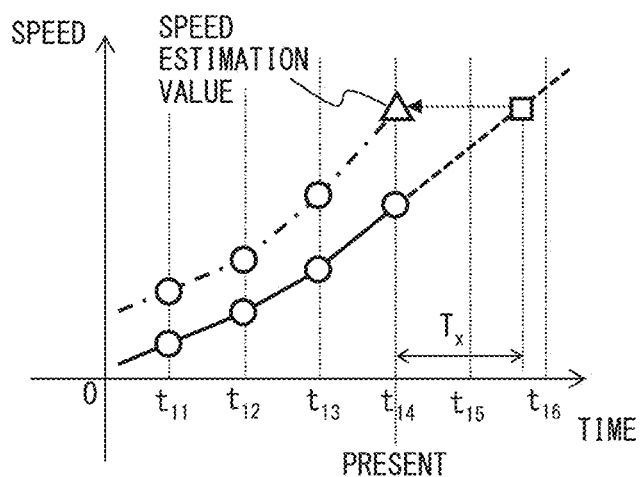

FIG. 18 is a view exemplarily illustrating a variation of speed of the servomotor for drive. FIG. 19A to FIG. 19C are views for explaining the calculation of a speed estimation value of the servomotor for drive in the neighborhood of a region D in FIG. 18.

The speed estimation value can be calculated by using an approximate straight line expressed by equation 1 for calculating an estimation value, which was described with reference to FIG. 6A and FIG. 6B. For example, when the least squares method is used for calculating the speed estimation value, as described with reference to FIG. 6A, the gradient $\alpha$ of the approximate straight line expressed by equation 1 for calculating the speed estimation value based on the least squares method can be calculated by using equation 2, and the intercept $\beta$ can be calculated by using equation 3, on the basis of three values of speed at or before the present time point, which are stored in the speed storage unit 35. For example, when the linear approximation is used for calculating the speed estimation value, as described with reference to FIG. 6B, the gradient $\alpha$ of the approximate straight line expressed by equation 1 for calculating the speed estimation value based on the linear approximation can be calculated by using equation 4, and the intercept $\beta$ can be calculated by using equation 5, on the basis of two values of speed at or before the present time point, which are stored in the speed storage unit 35. If a time instant later than the present time point by a predetermined time is substituted in the approximate straight line indicated by equation 1, which is calculated as described above, a speed estimation value at the time instant later by the predetermined time can be calculated. The speed estimation value calculation unit 36 in the output estimation unit 24 calculates the speed estimation value in every control cycle, according to the above-described serial process.

For example, as illustrated in FIG. 19A, when the present time instant is $t_{12}$, the gradient $\alpha$ and intercept $\beta$ in equation 1 are calculated based on the value of speed which is acquired by the speed acquisition unit 34 before time instant $t_{12}$ and is stored in the speed storage unit 35, and a speed estimation value is calculated by substituting time instant $t_{12}+T_x$, which is later than time instant $t_{12}$ of the present time point by a predetermined time $T_x$, for the variable t in equation 1. When time further advances and the present time instant has become $t_{13}$, as illustrated in FIG. 19B, the gradient $\alpha$ and intercept $\beta$ in equation 1 are calculated based on the value of speed which is acquired by the speed acquisition unit 34 before time instant $t_{13}$ and is stored in the speed storage unit 35, and a speed estimation value is calculated by substituting time instant $t_{13}+T_x$, which is later than time instant $t_{13}$ of the present time point by the predetermined time $T_x$, for the variable t in equation 1. When time further advances and the present time instant has become $t_{14}$, as illustrated in FIG. 19C, the gradient $\alpha$ and intercept $\beta$ in equation 1 are calculated based on the value of speed which is acquired by the speed acquisition unit 34 before time instant $t_{14}$ and is stored in the speed storage unit 35, and a speed estimation value is calculated by substituting time instant $t_{14}+T_x$, which is later than time instant $t_{14}$ of the present time point by the predetermined time $T_x$, for the variable t in equation 1.

The output estimation value calculation unit 37 calculates a servomotor-for-drive output estimation value by multiplication between the value of torque acquired by the torque acquisition unit 31 as described above and the speed estimation value calculated by the speed estimation value calculation unit 36.

The power consumption estimation value calculation unit 25 calculates a power consumption estimation value including at least the servomotor-for-drive output estimation value calculated by the output estimation value calculation unit 37. In other words, the power consumption estimation value calculation unit 25 calculates the power consumption estimation value by adding the servomotor-for-drive output estimation value calculated by the output estimation value calculation unit 37, the winding loss in the servomotor for drive 3, the loss in the converter 11, and the loss in the inverters for drive 12.

Figure 20:
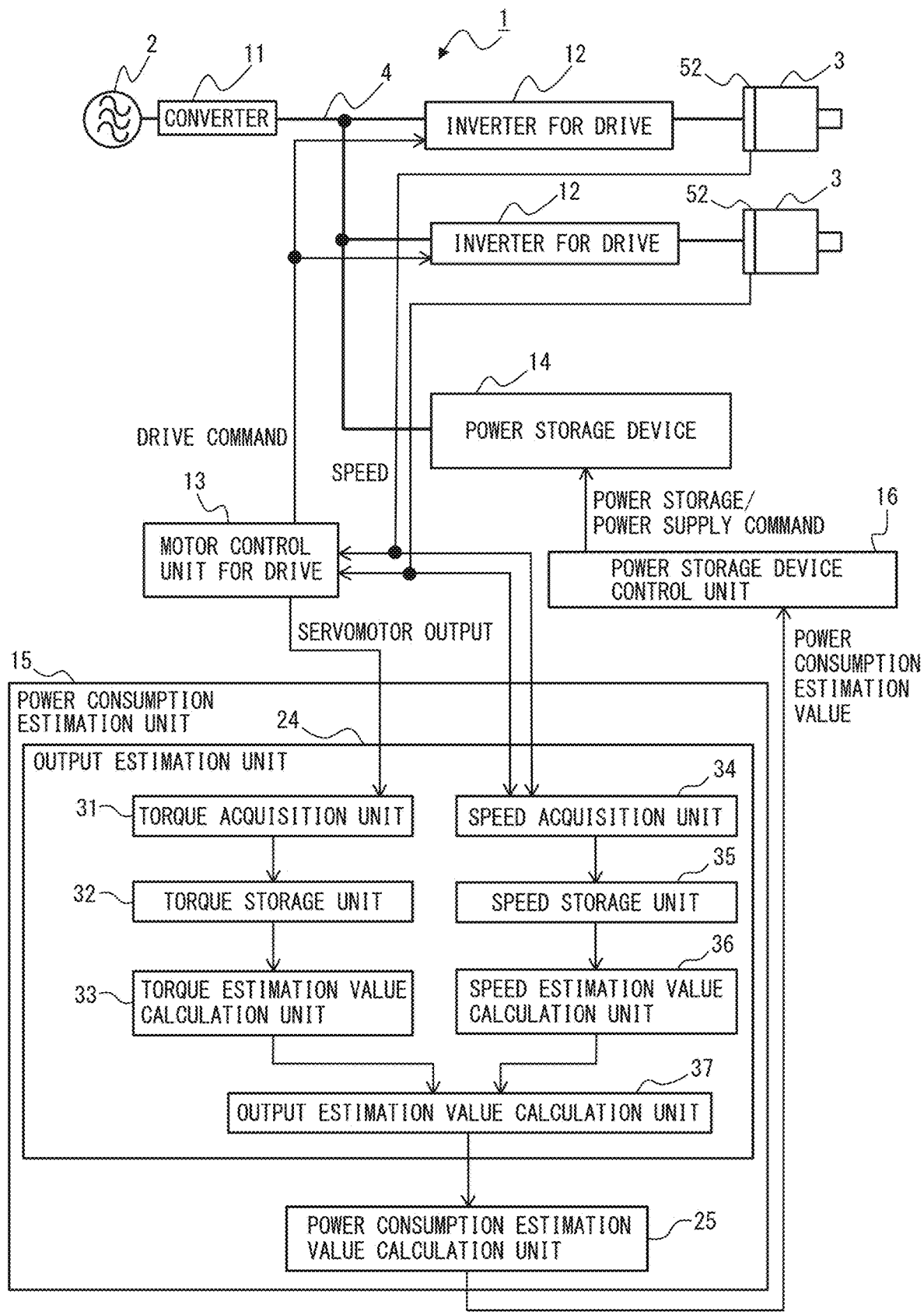
FIG. 20 is a block diagram illustrating the motor drive apparatus according to one embodiment of the present disclosure, which includes a power consumption estimation unit according to a fourth mode.

FIG. 20 is a block diagram illustrating the motor drive apparatus according to one embodiment of the present disclosure, which includes a power consumption estimation unit according to the fourth mode.

The power consumption estimation unit 15 according to the fourth mode includes an output estimation unit 24 which acquires a servomotor-for-drive output estimation value that is an estimation value at a time point later, by a predetermined time, than an output value at the present time point of the servomotors for drive 3; and a power consumption estimation value calculation unit 25 which calculates a power consumption estimation value including at least the servomotor-for-drive output estimation value.

In the fourth mode, the output estimation unit 24 includes a torque acquisition unit 31, a torque storage unit 32, a torque estimation value calculation unit 33, a speed acquisition unit 34, a speed storage unit 35, a speed estimation value calculation unit 36, and an output estimation value calculation unit 37.

The torque acquisition unit 31 acquires a value of torque of the servomotors for drive 3 from the motor control unit for drive 13.

The torque storage unit 32 stores the value of torque acquired by the torque acquisition unit 31. The torque storage unit 32 is composed of, for example, an electrically erasable programmable nonvolatile memory such as an EEPROM (trademark), or a random access memory which is capable of high-speed read/write, such as a DRAM or an SRAM.

The torque estimation value calculation unit 33 calculates a torque estimation value which is an estimation value later than a value of torque at the present time point by a predetermined time, based on at least two values of torque at or before the present time point, the at least two values of torque being stored in the torque storage unit 32. As regards the torque estimation value, for example, an approximate straight line is calculated by using at least two values of torque at or before the present time point, the at least two values of torque being stored in the torque storage unit 32, and a torque at a time instant later than the present time point by a predetermined time is estimated. The calculation method of the torque estimation value is the same as described with reference to FIG. 15 and FIGS. 16A to 16C in connection with the second mode.

The speed acquisition unit 34 acquires a value of speed of the servomotors for drive 3 from the speed detectors 52.

The speed storage unit 35 stores the value of speed of the servomotors for drive 3 acquired by the speed acquisition unit 34. The speed storage unit 35 is composed of, for example, an electrically erasable programmable nonvolatile memory such as an EEPROM (trademark), or a random access memory which is capable of high-speed read/write, such as a DRAM or an SRAM.

The speed estimation value calculation unit 36 calculates a speed estimation value which is an estimation value later than a value of speed at the present time point by a predetermined time, based on at least two values of speed at or before the present time point, the at least two values of speed being stored in the speed storage unit 35. As regards the speed estimation value, for example, an approximate straight, line is calculated by using at least two values of speed at or before the present time point, the at least two values of speed being stored in the speed storage unit 35, and a speed at a time instant later than the present time point by a predetermined time is estimated. The calculation method of the speed estimation value is the same as described with reference to FIG. 18 and FIGS. 19A to 19C in connection with the third mode.

The output estimation value calculation unit 37 calculates a servomotor-for-drive output estimation value by multiplication between the torque estimation value acquired by the torque estimation value calculation unit 33 as described above and the speed estimation value calculated by the speed estimation value calculation unit 36.

The power consumption estimation value calculation unit 25 calculates a power consumption estimation value including at least the servomotor-for-drive output estimation value calculated by the output estimation value calculation unit 37. In other words, the power consumption estimation value calculation unit 25 calculates the power consumption estimation value by adding the servomotor-for-drive output estimation value calculated by the output estimation value calculation unit 37, the winding loss in the servomotor for drive 3, the loss in the converter 11, and the loss in the inverters for drive 12.

Note that since the influence of the output of the servomotor for drive 3 is dominant in the total power consumption, the output estimation value of the servomotor for drive 3 is calculated in the power consumption estimation units 15 according to the second to fourth modes. As a modification in connection with this, estimation values may be calculated with respect to the winding loss in the servomotor for drive 3, the loss in the converter 11, and the loss the inverters for drive 12, and a power consumption estimation value including these estimation values may be calculated.

The above-described motor control unit for drive 13, power consumption estimation unit 15 and power storage device control unit 16 may be constituted by, for example, a software program form, or may be constituted by a combination of various electronic circuits and software programs. In this case, for example, an arithmetic processing device, such as a CPU or an MPUDSP, may be caused to execute the software programs to realize the functions of the respective components. Alternatively, the motor control unit for drive 13, power consumption estimation unit 15 and power storage device control unit 16 may be realized by a semiconductor integrated circuit in which software programs for realizing the functions of the motor control unit for drive 13, power consumption estimation unit 15 and power storage device control unit 16 are stored.

The motor control unit for drive 13, power consumption estimation unit 15 and power storage device control unit 16 are provided, for example, in a main control device (not illustrated) of the motor drive apparatus 1. For example, when the motor drive apparatus 1 is configured to control the driving of the servomotors for drive 3 provided in a machine tool, the motor control unit for drive 13, power consumption estimation unit 15 and power storage device control unit 16 may be provided in a numerical controller of the machine tool. When the motor control unit for drive 13, power consumption estimation unit 15 and power storage device control unit 16 are constituted in the software program form, an arithmetic processing unit in the numerical controller may be caused to execute the software program, and thereby the functions of the respective components can be realized.

According to one embodiment of the present disclosure, in the motor drive apparatus including the power storage device that is provided in order to reduce the power peak of the power source equipment, the power peak can surely be reduced.

The invention claimed is:

1. A motor drive apparatus, comprising:
   a converter configured to perform power conversion between AC power on an AC power source side and DC power in a direct current link;
   an inverter configured to perform bidirectional power conversion
     between DC power in the direct current link and AC power serving as drive power for a servomotor, and
     between regenerative power generated by the servomotor and DC power in the direct current link;
   a motor control unit configured to control the servomotor connected to the inverter;
   a power storage device configured to supply DC power to the direct current link and to store DC power from the direct current link;
   a power consumption estimation unit configured to calculate a power consumption estimation value, which is an estimation value of a total power consumption at a time point later, by a predetermined time, than a present time point, the power consumption estimation value being calculated based on at least two values of the total power consumption at or before the present time point, the total power consumption being obtained as a sum of
(1) an output of the servomotor for drive,
(2) a winding loss in the servomotor for drive,
(3) a loss in the converter, and
(4) a loss in the inverter for drive; and
a power storage device control unit configured to control power supply and power storage of the power storage device in accordance with the power consumption estimation value.

2. The motor drive apparatus according to claim 1, wherein
the power storage device control unit is configured to compare the power consumption estimation value with a threshold for power supply and a threshold for power storage,
when the power storage device control unit determines, as a result of the comparison, that the power consumption estimation value exceeds the threshold for power supply, the power storage device control unit controls the power storage device and causes the power storage device to supply DC power to the direct current link, and
when the power storage device control unit determines, as the result of the comparison, that the power consumption estimation value falls below the threshold for power storage, the power storage device control unit controls the power storage device and causes the power storage device to store DC power from the direct current link.

3. The motor drive apparatus according to claim 1, wherein the power consumption estimation unit includes:
a power consumption calculation unit configured to calculate the total power consumption;
a power consumption storage unit configured to store a value of the total power consumption calculated by the power consumption calculation unit; and
a power consumption estimation value calculation unit configured to calculate the power consumption estimation value, based on the at least two values of the total power consumption at or before the present time point, the at least two values being stored in the power consumption storage unit.

4. The motor drive apparatus according to claim 1, wherein the power consumption estimation unit includes:
an output estimation unit configured to acquire a servomotor output estimation value which is an estimation value at a time point later, by the predetermined time, than an output value at the present time point of the servomotor; and
a power consumption estimation value calculation unit configured to calculate the power consumption estimation value including at least the servomotor output estimation value.

5. The motor drive apparatus according to claim 1, further comprising a measuring unit configured to measure a response delay time from when the power storage device control unit outputs a power supply command or a power storage command to the power storage device to when the power storage device actually starts power supply or power storage,
wherein the predetermined time includes at least the response delay time.

6. The motor drive apparatus according to claim 1, wherein the power storage device includes:
a flywheel which is capable of storing rotation energy;
a further servomotor including a rotation shaft to which the flywheel is connected; and
a further inverter configured to perform bidirectional power conversion
between DC power in the direct current link and AC power serving as drive power for the further servomotor, and
between regenerative power generated by the further servomotor and DC power in the direct current link.

7. The motor drive apparatus according to claim 1, wherein the power storage device includes:
a capacitor; and
a DC/DC converter configured to perform power conversion between DC power in the direct current link and DC power stored in the capacitor.

8. A motor drive apparatus, comprising:
a converter configured to perform power conversion between AC power on an AC power source side and DC power in a direct current link;
an inverter configured to perform bidirectional power conversion
between DC power in the direct current link and AC power serving as drive power for a servomotor, and
between regenerative power generated by the servomotor and DC power in the direct current link;
a motor control unit configured to control the servomotor connected to the inverter;
a power storage device configured to supply DC power to the direct current link and to store DC power from the direct current link;
a power consumption estimation unit configured to acquire a power consumption estimation value which is an estimation value of a total power consumption at a time point later, by a predetermined time, than a present time point, the total power consumption being obtained as a sum of an output of the servomotor, a winding loss in the servomotor, a loss in the converter and a loss in the inverter; and
a power storage device control unit configured to control power supply and power storage of the power storage device in accordance with the power consumption estimation value, wherein
the power consumption estimation unit includes:
an output estimation unit configured to acquire a servomotor output estimation value which is an estimation value at a time point later, by the predetermined time, than an output value at the present time point of the servomotor; and
a power consumption estimation value calculation unit configured to calculate the power consumption estimation value including at least the servomotor output estimation value, and
the output estimation unit includes:
a torque acquisition unit configured to acquire a value of torque of the servomotor;
a torque storage unit configured to store the value of the torque acquired by the torque acquisition unit;
a torque estimation value calculation unit configured to calculate a torque estimation value which is an estimation value later than a value of the torque at the present time point by the predetermined time, based on at least two values of the torque at or before the present time point, the at least two values of the torque being stored in the torque storage unit;
a speed acquisition unit configured to acquire a value of speed of the servomotor; and an output estimation value calculation unit configured to calculate the servomotor output estimation value, based on the torque estimation value and the value of the speed at the present time point.

9. A motor drive apparatus, comprising:
a converter configured to perform power conversion between AC power on an AC power source side and DC power in a direct current link;
an inverter configured to perform bidirectional power conversion
between DC power in the direct current link and AC power serving as drive power for a servomotor, and between regenerative power generated by the servomotor and DC power in the direct current link;
a motor control unit configured to control the servomotor connected to the inverter;
a power storage device configured to supply DC power to the direct current link and to store DC power from the direct current link;
a power consumption estimation unit configured to acquire a power consumption estimation value which is an estimation value of a total power consumption at a time point later, by a predetermined time, than a present time point, the total power consumption being obtained as a sum of an output of the servomotor, a winding loss in the servomotor, a loss in the converter and a loss in the inverter; and
a power storage device control unit configured to control power supply and power storage of the power storage device in accordance with the power consumption estimation value, wherein
the power consumption estimation unit includes:
an output estimation unit configured to acquire a servomotor output estimation value which is an estimation value at a time point later, by the predetermined time, than an output value at the present time point of the servomotor; and
a power consumption estimation value calculation unit configured to calculate the power consumption estimation value including at least the servomotor output estimation value, and
the output estimation unit includes:
a torque acquisition unit configured to acquire a value of torque of the servomotor;
a speed acquisition unit configured to acquire a value of speed of the servomotor;
a speed storage unit configured to store the value of the speed of the servomotor acquired by the speed acquisition unit;
a speed estimation value calculation unit configured to calculate a speed estimation value which is an estimation value later than a value of the speed at the present time point by the predetermined time, based on at least two values of the speed at or before the present time point, the at least two values of the speed being stored in the speed storage unit; and
an output estimation value calculation unit configured to calculate the servomotor output estimation value, based on the speed estimation value and the value of the torque at the present time point.

10. A motor drive apparatus, comprising:
a converter configured to perform power conversion between AC power on an AC power source side and DC power in a direct current link;
an inverter configured to perform bidirectional power conversion
between DC power in the direct current link and AC power serving as drive power for a servomotor, and between regenerative power generated by the servomotor and DC power in the direct current link;
a motor control unit configured to control the servomotor connected to the inverter;
a power storage device configured to supply DC power to the direct current link and to store DC power from the direct current link;
a power consumption estimation unit configured to acquire a power consumption estimation value which is an estimation value of a total power consumption at a time point later, by a predetermined time, than a present time point, the total power consumption being obtained as a sum of an output of the servomotor, a winding loss in the servomotor, a loss in the converter and a loss in the inverter; and
a power storage device control unit configured to control power supply and power storage of the power storage device in accordance with the power consumption estimation value, wherein
the power consumption estimation unit includes:
an output estimation unit configured to acquire a servomotor output estimation value which is an estimation value at a time point later, by the predetermined time, than an output value at the present time point of the servomotor; and
a power consumption estimation value calculation unit configured to calculate the power consumption estimation value including at least the servomotor output estimation value, and
the output estimation unit includes:
a torque acquisition unit configured to acquire a value of torque of the servomotor;
a torque storage unit configured to store the value of the torque acquired by the torque acquisition unit;
a torque estimation value calculation unit configured to calculate a torque estimation value which is an estimation value later than a value of the torque at the present time point by the predetermined time, based on at least two values of the torque at or before the present time point, the at least two values of the torque being acquired by the torque acquisition unit;
a speed acquisition unit configured to acquire a value of speed of the servomotor;
a speed storage unit configured to store the value of the speed of the servomotor acquired by the speed acquisition unit;
a speed estimation value calculation unit configured to calculate a speed estimation value which is an estimation value later than a value of the speed at the present time point by the predetermined time, based on at least two values of the speed at or before the present time point, the at least two values of the speed being acquired by the speed acquisition unit; and
an output estimation value calculation unit configured to calculate the servomotor output estimation value, based on the torque estimation value and the speed estimation value.

* * * * *